United States Patent [19]

Tanaka et al.

[11] Patent Number: 5,392,286
[45] Date of Patent: Feb. 21, 1995

[54] DATA TRANSMISSION SYSTEM WITH PACKETS HAVING OCCUPIED, IDLE, RELEASED, AND RESET STATES

[75] Inventors: Tsutomu Tanaka, Nishinomiya; Kouji Kubota, Osaka, both of Japan

[73] Assignee: Matsushita Electric Industrial Co., Ltd., Osaka, Japan

[21] Appl. No.: 107,219

[22] Filed: Aug. 16, 1993

[30] Foreign Application Priority Data

Aug. 17, 1992 [JP] Japan .................. 4-217990
Nov. 12, 1992 [JP] Japan .................. 4-302016
Jan. 12, 1993 [JP] Japan .................. 5-003543

[51] Int. Cl.⁶ .............................................. H04J 3/24
[52] U.S. Cl. ............................ 370/94.1; 370/85.5; 370/85.15
[58] Field of Search ............ 370/95.1, 94.1, 60.1, 370/82, 84, 85.5, 85.12, 85.14, 85.15

[56] References Cited

U.S. PATENT DOCUMENTS

| | | | |
|---|---|---|---|
| 4,347,498 | 8/1982 | Lee et al. | 370/94.1 |
| 4,995,032 | 2/1991 | Demichelis et al. | 370/94.1 |
| 5,063,562 | 11/1991 | Barzilai et al. | 370/82 |
| 5,142,653 | 8/1992 | Schefts | 370/94.1 |
| 5,182,747 | 1/1993 | Frenzel, III et al. | 370/85.5 |
| 5,214,648 | 5/1993 | Lespagnol et al. | 370/94.1 |

FOREIGN PATENT DOCUMENTS

| | | |
|---|---|---|
| 1223852 | 6/1989 | Japan . |
| 310433 | 1/1991 | Japan . |
| 3104340 | 5/1991 | Japan . |
| 439941 | 7/1992 | Japan . |

OTHER PUBLICATIONS

A Study on the Architecture of a High–Speed Ring Network (ATMR) by Ito et al., Switching Systems Engineering, IEICE Technical Report, 1990, pp. 19–24 (with English Abstract).

Primary Examiner—Douglas W. Olms
Assistant Examiner—Shick Hom
Attorney, Agent, or Firm—Price, Gess & Ubell

[57] ABSTRACT

Disclosed is a data transmission unit for use in a system wherein data to be transmitted is organized into packets which may be assigned one of four states: idle, occupied, released, or reset. Or these packets may be assigned one of three states: idle, occupied, or released, each state being able to include a reset bit. Each unit has terminals associated therewith and is assigned two windows on the number of packets it may transmit. One window is a parameter for transmitting data by using idle packets and the other is by using released packets. The unit responds to the state of a received packet, the state of the windows, and the presence or absence of transmit data to control whether the packet transmitted out of the unit is a packet from internal transforming buffers, a released packet from a released cell producing circuit, an occupied packet containing data from the unit's own terminals. A released packet contains the address of the unit which generated it and is generated when there is no data to be transmitted and an idle packet is received by the unit. Any unit can occupy a released packet with data from its terminal within the second window band, thereby increasing data throughput.

49 Claims, 25 Drawing Sheets 1503,1504 receiving buffers
1505,1506 transmitting buffers
1507 cell input unit
1512 cell output unit Fig.3
PRIOR ART TM: cell transmitting unit
TF: cell state transforming unit

| received cells | destination | cell receiving unit ○receipt | cell state transforming unit | windows | transmitting queue | cell sender | remaining band | remaining queue | cell to be transmitted |
|---|---|---|---|---|---|---|---|---|---|
| occupied | another node | | occupied(1.1) | | | TF | W | Q | occupied |
| | the node | ○ | | | | | | | |
| idle | the node / another node | | idle(1.2) | | Q>0 | TM | W-1 | Q-1 | occupied |
| released | the node | | | not exhausted w>0 | | | | | |
| | another node | | released(1.3) | | | TM | W | Q-1 | occupied |
| occupied | another node | | occupied(2.1) | | | TF | W | 0 | occupied |
| | the node | ○ | | | | | | | |
| idle | the node / another node | | idle(2.2) | | Q=0 | TM | W-1 | 0 | released |
| released | the node | | | | | | | | |
| | another node | | released(2.3) | | | TF | W | 0 | released |
| occupied | another node | | occupied(3.1) | | | TF | 0 | Q | occupied |
| | the node | ○ | | | | | | | |
| idle | the node / another node | | idle(3.2) | | Q>0 | TF | 0 | Q | idle |
| released | the node | | | exhausted w=0 | | | | | |
| | another node | | released(3.3) | | | TM | 0 | Q-1 | occupied |
| occupied | another node | | occupied(4.1) | | | TF | 0 | 0 | occupied |
| | the node | ○ | | | | | | | |
| idle | the node / another node | | idle(4.2) | | Q=0 | TF | 0 | 0 | idle |
| released | the node | | | | | | | | |
| | another node | | released(4.3) | | | TF | 0 | 0 | released |

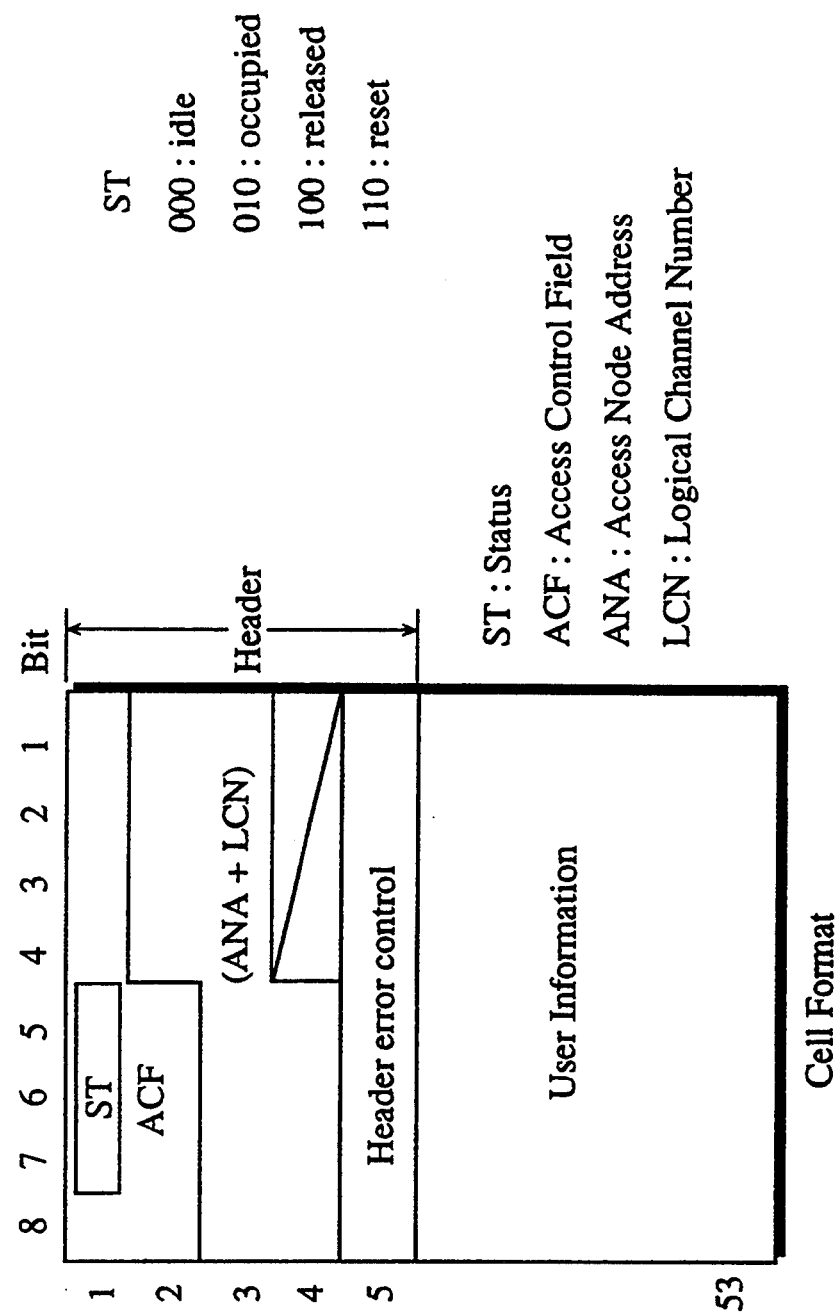

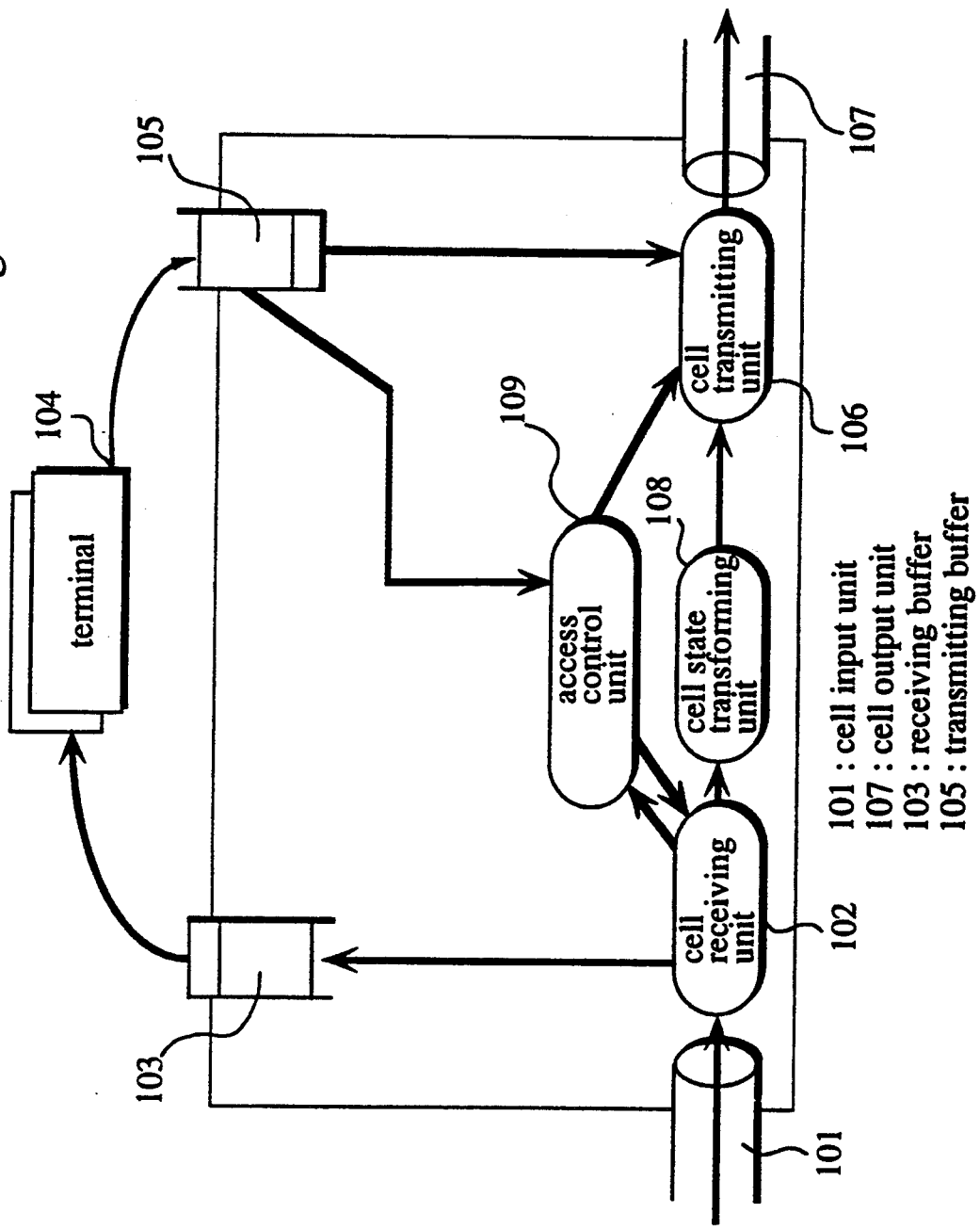

Fig.7 cell sender
TF: cell state transforming unit
TM: cell transmitting unit

| received cells | destination | cell receiving buffer O:receipt | cell state transforming unit | window W1 | window W2 | transmission request Q1 | transmission request Q2 | cell sender | window band | cell to be transmitted |
|---|---|---|---|---|---|---|---|---|---|---|
| (a) occupied | another node | | (e) occupied | * | * | * | * | TF | | occupied |
| | the node | O | | | | | | | | |
| (b) idle | the node | | (f) idle | W1>1 | | Q1>0 | | TM | W1-1 | occupied ☆ |
| | | | | | | Q1=0 | | | | released ☆ |
| | another node | | idle (hunt mode) | W1=0 | | * | | TF | | idle ☆ |
| | the node | | (g) reset (normal mode) | * | W2 reset | * | | TF | | reset the node |
| (c) released | another node | | (h) released | W1>0 | * | Q1>0 | * | TM | W1-1 | occupied |
| | | | | W1=0 | W2>0 | * | Q2>0 | | W2-1 | |
| | | | | * | | Q1=0 | Q2=0 | TF | | released another node |
| | | | | W1=0 | | Q1>0 | | | | |
| | | | | W1>0 | W2=0 | Q1=0 | | | | |
| | | | | W1=0 | | * | | | | |
| (d) reset | the node | | (f) idle | W1>0 | | Q1>0 | | TM | W1-1 | occupied |
| | | | | | | Q1=0 | | | | released the node |
| | | | | W1=0 | | * | | TF | | idle |
| | another node | | (g) reset | * | W2 reset | * | | | | reset another node | symbol * means don't care cells with ☆ may have R-bit

Fig.11

| values of transmitting buffers 361, 362 and window counters 302,307 | | | | transformation in the cell state transforming circuit 371a | | | |
|---|---|---|---|---|---|---|---|
| W1 | Q1 | W2 | Q2 | occupied | idle | released | reset |
| 1 | 1 | 1 | 1 | relay ↓ | occupied (Q1) ↓ | occupied (Q1) ↓ | — |
| 1 | 1 | 1 | 0 | | | | — |
| 1 | 1 | 0 | 1 | | | | relay ↓ |
| 1 | 1 | 0 | 0 | | | | |
| 1 | 0 | 1 | 1 | | released ↓ | occupied (Q2) relay ↓ | — |
| 1 | 0 | 1 | 0 | | | | — |
| 1 | 0 | 0 | 1 | | | | relay ↓ |
| 1 | 0 | 0 | 0 | ↓ | ↓ | | |
| 0 | 1 | 1 | 1 | | relay ↓ | occupied (Q2) relay ↓ | — |
| 0 | 1 | 1 | 0 | | | | — |
| 0 | 1 | 0 | 1 | | | | relay ↓ |
| 0 | 1 | 0 | 0 | ↓ | ↓ | | |
| 0 | 0 | 1 | 1 | | | occupied (Q2) relay ↓ | — |
| 0 | 0 | 1 | 0 | | | | — |
| 0 | 0 | 0 | 1 | | | | relay ↓ |
| 0 | 0 | 0 | 0 | ↓ | ↓ | ↓ | ↓ |

Fig.15 cell sender
 TF:cell state transforming unit
 TM:cell transmitting unit

| received cells | destination | cell receiving buffer O:receipt | cell state transforming unit | window W1 | W2 | transmission request Q1 | Q2 | | window band | cell to be transmitted |
|---|---|---|---|---|---|---|---|---|---|---|
| (1-a)(2-a) occupied | another node | | (d)occupied | \* | | | | TF | | occupied |
| (1-b)(2-b) idle | the node | O | | | | | | | | |
| | the node / another node | | (e) idle | W1>1 | | Q1>0 | | TM | W1-1 | occupied☆ |
| | | | | | | Q1=0 | | TF | | released☆ |
| | | | idle | W1=0 | | \* | | | | idle☆ |
| | the node | | | | | | | | | |
| (1-c)(2-c) released | another node | | (f) released | W1>0 | \* | Q1>0 | \* | TM | W1-1 | occupied |
| | | | | W1=0 | W2>0 | \* | Q2>0 | | W2-1 | |
| | | | | \* | | Q1=0 | Q2=0 | TF | | released |
| | | | | W1=0 | | Q1>0 | | | | |
| | | | | W1>0 | W2=0 | Q1=0 | | | | |
| | | | | W1=0 | | \* | | | | | symbol \* means don't care
cells with ☆ may have R-bit

Fig.21 cell sender
TF:cell state transforming unit
TM:cell transmitting unit

| received cells | destination | cell receiving buffer O:receipt | cell state transforming unit | window W1 | W2 | Wm | transmission request Q1 | Q2 | | window band | cell to be transmitted |
|---|---|---|---|---|---|---|---|---|---|---|---|
| (1-a)(2-a) occupied | another node | | (d)occupied | * | | | | | TF | | occupied |
| | the node | O | | | | | | | | | |
| (1-b)(2-b) idle | the node another node | | (e) idle | W1>0 | * | | Q1>0 | | TM | W1-1 | occupied ☆ |
| | | | | | | | Q1=0 | | TF | W1-1 | released ☆ |
| | | | idle | W1=0 | Wm>0 | | * | | TF | Wm-1 | |
| | the node | | | | Wm=0 | | | | TM | | idle ☆ |
| (1-c)(2-c) released | another node | | (f) released | W1>0 | * | | Q1>0 | * | | W1-1 | |
| | | | | W1=0 | W2>0 | | * | Q2>0 | TM | W2-1 | occupied |
| | | | | | | | Q1=0 | Q2=0 | | | |
| | | | | * | * | | Q1>0 | | | | |
| | | | | W1=0 | | | Q1=0 | | TF | | released |
| | | | | W1>0 | W2=0 | | | | | | |
| | | | | W1=0 | | | * | | | | | symbol * means don't care
cells with ☆ may have R-bit

DATA TRANSMISSION SYSTEM WITH PACKETS HAVING OCCUPIED, IDLE, RELEASED, AND RESET STATES

BACKGROUND OF THE INVENTION

1. Field of the Invention

This invention relates to a data transmission system in which multimedia information robe transmitted is organized into packets and transmitted among nodes interconnected on a ring ATM (Asynchronous Transfer Mode) network.

2. Description of the Related Art

Conventional data transmission systems used in a ring ATM network are disclosed, for example, in Japanese Patent Application No. 3-107802, and "A Study on the Architecture of a High-Speed Ring Network (ATMR)" (Ito, et al: Switching Systems Engineering, IEICE Technical Report).

The construction of such ring network is described as follows with reference to FIGS. 1 and 2.

In FIG. 1, nodes 203–206 transmit data among each other in the form of packets (hereinafter referred to as ring cells) onto a pair of ring transmission paths in which ring cells circulate in opposite directions. Each of the ring cells is assigned one of three states: idle, occupied, or released for the purpose of guaranteeing each node fairness in the use of the ring cells. Each of the ring cells has a fixed length, including a pay load carrying 48-byte user information and a 5-byte header carrying other information such as an identification number of a destination node and status (ST) bits indicative to the state of the ring cell. A network managing unit 207 assigns each node a window on the number of ring cells it may transmit. Each node has terminals associated therewith, which may or may not have data to transmit. For example, terminals 201 and 202 are respectively connected with the nodes 204 and 205. FIG. 2 shows the configuration of one of the nodes shown in FIG. 1 associated with terminals 1501 and 1502.

The node receives ring cells through a cell input unit 1507.

A cell receiving unit 1508 checks the header of a ring cell received through the cell input unit 1507; if the ring cell is in the occupied state and has a destination address of its own node, user data is taken out from the ring cell.

Receiving buffers 1503 and 1504 store the user data taken out by the cell receiving unit 1508.

Transmitting buffers 1505 and 1506 store user data sent from the terminals 1501 and 1502.

A cell state transforming unit 1509 transforms, if necessary, the state of a ring cell and temporarily stores it.

A cell state managing unit 1510 manages the state of each ring cell and its transformation.

A cell transmitting unit 1511 first provides user data present in the transmitting buffers 1505 and 1506 with a necessary procedure such as designating a destination, and then transmits it as a ring cell onto one of the transmission paths.

The ring cell is transmitted from the node onto one of the transmission path through a cell output unit 1512.

The following is a description of the operation of the above-constructed ring network, provided that data organized in the form of a ring cell is transmitted from the terminal 201 to the terminal 202.

If the node 204 associated with the terminal 201 used every arriving ring cell exclusively to communicate with the node 205, the other nodes 203 and 206 positioned between them on the transmission path could not use a single ring cell. This is the reason that each node is assigned a window on the number of ring cells it may transmit.

In a connectionless type data transmission system, each node is assigned a fixed window. In a connection type data transmission system, on the other hand, each node is assigned a window band as desired by the network managing unit 207 in advance to every data transmission as follows:

Before transmitting data of its terminal 201, the node 204 requests the network managing unit 207 for a window band sufficient for a data transmission (setting logical connection). The network managing unit 207 judges whether the request is acceptable or not, based on the conditions of the use of the transmission paths or the window band already assigned to the node 204. If the request is acceptable, additional window band is assigned to the node 204 within a range that the overall window bands assigned to all the nodes does not exceed the entire window bands of the transmission paths.

The above-mentioned window band indicates the number of ring cells each node may transmit among all the ring cells arriving at the node and is defined as follows:

window band = (the number of ring cells which each node is guaranteed to use per a unit time)/(the number of ring cells arriving at each node per a unit time)

In this example, the speed of transmitting ring cells is about 1.4M cell/sec.. When the window band assigned to the node is 20k cell/sec., the window band becomes 1/70. The node 204 can transmit data, according to the assigned window band. Thus the assigned window band is controlled by the cell state managing unit 1510 having a window counter unit (not shown). The window counter unit counts up by 1 per 70 cells received and counts down by 1 every time one ring cell is transmitted. If the counter value is 1 or more, the window has not been exhausted (not reached the limit), when the counter value is 0, the window has been exhausted (reached the limit).

The operation of the nodes is described as follows with reference to FIG. 2.

When a ring cell traveling on a transmission path arrives, each node may either receive it, forward it as it is, or transform its state responding to the state thereof. The ring cells can be in the idle, occupied or released state.

1) An idle cell is a cell including no user data. When such cell arrives, each node may occupy the cell with data from its terminal if its window has not been exhausted, decrementing the window counter by 1.

2) An occupied cell is a cell including user data. When such cell arrives, each node forwards the cell as it is if the cell is bound for another node, and otherwise receives user data therefrom and then handles the cell in the same manner as handling an idle cell.

3) A released cell is a cell containing no user data and containing the address of the node which generated the cell, and is generated when the node has no data to be transmitted and has received an idle cell. When such cell arrives, each node may occupy the cell with data of its terminal even if its window has already been exhausted.

In FIG. 2, a ring cell arrived at a node is forwarded to the cell receiving unit 1508 and to the cell state transforming unit 1509. The cell receiving unit 1508 analyzes the header of the ring cell: when the cell has a destination address of its own and is in the occupied state, user data is taken out of the ring cell and stored in to either the receiving buffer 1503 or 1504. Otherwise, the cell is not stored in either buffer.

At the same time, the cell state transforming unit 1509 responds to a destination address and the state of the ring cell. When the ring cell is:

1) in the occupied state and bound for the node, the ring cell is transformed into an idle ring cell,
2) in the occupied state and bound for another node, its state is kept unchanged,
3) in the idle state, its state is kept unchanged,
4) in the released state and bound for the node which generated it, the ring cell is transformed into an idle ring cell,
5) in the released state and bound for another node, its state is kept unchanged.

Responding to the above-mentioned results, the cell state managing unit 1510 determines whether it should transmit the ring cell through the cell state transforming unit 1509 without transforming its state or transmit it through the cell transmitting unit 1511 after occupying it with data, responding to the state of the window and the presence or absence of data in the transmitting buffer. Such control of the cell state managing unit 1510 is described as follows with reference to FIG. 3.

Each pair of numbers appearing in the parentheses below corresponds to that appearing in FIG. 3, column 4.

(1) The window has not been exhausted and the transmitting buffer has data:

(1.1) if the transformed ring cell is in the occupied state, then the unit 1510 causes the cell state transforming unit 1509 to forward the ring cell as it is to the cell output unit 1512. This is because the ring cell is bound for another node.

(1.2) if the transformed ring cell is in the idle state, then the unit 1510 causes the cell transmitting unit 1511 to occupy the ring cell with data of its terminal and to transmit it to the cell output unit 1512. At this moment, the window counter decrements by one.

(1.3) if the transformed ring cell is in the released state, then the unit 1510 causes the cell transmitting unit 1511 to occupy the ring cell with data of its terminal and to transmit it to the cell output unit 1512. At this moment, the window counter is kept unchanged.

(2) the window has not been exhausted and the transmitting buffer has no data:

(2.1) if the transformed ring cell is in the occupied state, then the unit 1510 causes the cell state transforming unit 1509 to forward the ring cell as it is to the cell output unit 1512. This is the same as in (1.1).

(2.2) if the transformed ring cell is in the idle state, then the unit 1510 causes the cell transmitting unit 1511 to make the ring cell be bound for the node which generated it and be in the released state, and transmits the transformed ring cell into the cell output unit 1512. At this moment, the window counter decrements by one. The reason that the ring cell is transformed into a released cell is to give the right to use the ring cell to another node whose window has been already exhausted.

(2.3) if the transformed ring cell is in the released state, then the unit 1510 causes the cell state transforming unit 1509 to forward the ring cell as it is to the cell output unit 1512.

(3) The window has been exhausted and the transmitting buffer has data:

(3.1) if the transformed ring cell is in the occupied state, then the unit 1510 causes the cell state transforming unit 1509 to forward the ring cell as it is to the cell output unit 1512. This is the same as in (1.1).

(3.2) if the transformed ring cell is in the idle state, then the unit 1510 causes the cell state transforming unit 1509 to forward the ring cell as it is to the cell output unit 1512.

(3.3) if the transformed ring cell is in the released state, then the unit 1510 causes the cell transmitting unit 1511 to occupy the ring cell with data of its terminal and transmit it to the cell output unit 1512.

(4) The window has not been exhausted and the transmitting buffer has no data, the unit 1510 causes the cell state transforming unit 1509 to forward the ring cell as it is to the cell output unit 1512, regardless of the state transformed by the cell state transforming unit 1509.

As described hereinbefore, the conventional ring network is characterized in that ring cells are allocated to one of those three states. Data to be transmitted in such a ring network is, for example, CBR (Continuous Bit Rate) data requiring periodic arrival of information such as voice, or VBR (Variable Bit Rate) data, which easily goes into a burst mode. This ring network guarantees each node the use of idle ring cells corresponding to the window band assigned thereto, so that it is suitable for CBR data transmission. The ring network also allows the use of released cells.

If 60% is actually exhausted out of the total window bands assigned to each node, then the remaining 40% corresponds to released cells on the ring. When VBR data having a burst mode such as computer data is transmitted, it may temporarily require data transmission above the assigned window band. This is manageable by using released cells having no window of its use. Such use of released cells allows the conventional ring network to balance the use of window band among all the nodes, thereby enhancing data throughput.

In addition, the ring network, when both CBR data and VBR data are transmitted, uses the reserved cell communication system to guarantee the transmission of CBR data having a smaller delay time capacity. This system has a reserved cell phase and a using cell phase.

In the reserved cell phase, the nodes reserve the use of ring cells to ensure the number of ring cells required to transmit CBR data. For example, if a node is informed by another node of the transmission of CBR data corresponding to N cells per T time, a reserve bit and the address of the node which reserved the cells are set.

In the using cell phase, each node, upon receiving a reserved cell, forwards the cell as it is unless it is a cell of its own reservation. The node which reserved it occupies the cell with data of its terminal after confirming the reserve bit and the address of the node which reserved it. This procedure is continued until the connection is disconnected.

The reserved cells return to the originating node without being used in the other nodes even if they are in a reusable state. Thus, according to the reserved cell communication system, cells to be used for CBR data in a certain time interval can be ensured.

However, the conventional ring network system fails to guarantee fairness in the use of released cells among all the nodes. In other words, when node occupies all of the released cell available, a lower node may be prevented from using them.

Furthermore, according to the conventional ring network system, in the cell reservation phase, every cell to be reserved requires the setting of a reserve bit and the address of the node which reserved the cell. This may increase delay time for cell transmission. In addition, when several nodes each reserve the number of cells required, these nodes can transmit data safely (multiplexed); however, not all reserved cells are used. And even if there is a reserved cell available, the other nodes cannot use it. This makes it difficult to transmit VBR data, thus deteriorating the efficiency of data throughput in accordance with the increase in the number of multiplexed data transmission.

SUMMARY OF THE INVENTION

In view of the foregoing problems, this invention aims at to provide a data transmission system with high fairness and data throughput by managing a window band assigned to each node.

To be more precise, a first object of this invention is to provide a data transmission system in which each data transmission node can be guaranteed fairness in transmitting occupied cells generated by inserting user data into released cells.

A second object of this invention is to provide a data transmission system capable of preventing data transmission delay or cell flow interruption when occupied cells generated by inserting user data into idle cells are transmitted.

A third object of this invention is to provide a data transmission system capable of efficiently multiplexing window bands for priority data and non-priority data assigned to each node on the ring network when these data are transmitted separately.

The first object can be achieved by a data transmission unit, wherein a number of the units are interconnected in a ring network via a transmission path and transmit data in the form of cells, each having a fixed length. The data transmission unit comprises the following devices.

A receiving device for receiving cells from the transmission path, a received cell being either occupied, idle, or released, an idle cell being a cell containing no user information.

A transmitting device for inserting user data into a selected cell to create an occupied cell and transmitting the occupied cell to the transmission path and for generating and transmitting a released cell to the transmission path, a released cell being a cell containing no user information and containing information identifying it as a released cell originating from the unit.

A discriminating device for discriminating the state of a received cell to be either occupied, idle, or released.

A first judging device for judging whether the number of transmitted occupied cells, which are generated by inserting user data into received idle cells reaches a first selected window assigned to the data transmission unit.

A second judging device for judging whether the number of transmitted occupied cells, which are generated by inserting user data into received released cells reaches a second selected window assigned to the data transmission unit.

A relaying device for relaying cells from the receiving device to the transmitting device.

A controlling device for controlling the transmitting device to occupy a received idle cell with user data, if any, and transmit the occupied cell and continuing to transmit occupied cells until the first selected window is attained and, after the first window has been attained, for controlling the transmitting device to transmit the received idle cell from the relaying device.

The controlling device further controls the transmitting device to occupy a received released cell bound for another the unit with user data and transmit the occupied cell and continuing to transmit occupied cells until the second selected window is attained and, after the second window has been attained, for controlling the transmitting device to transmit the received released cell from the relaying device.

According to the above-mentioned construction, transmission of occupied cells transformed from released cells are continued until the second selected window has been attained, and after the second selected window has been attained, released cells are transmitted without being inserted user data thereinto.

Thus, each node is guaranteed fairness in transmitting user data by using released cells.

The second object can be achieved by a data transmission unit further comprising the following devices:

A reset judging device for judging whether a received cell is a reset cell including a reset direction and a clearing device for, when a reset cell is received, clearing the number to be indicated by the second judging device.

The data transmission unit may comprise the following devices instead:

A reset judging device for judging whether a received cell includes a reset bit indicative to a reset operation or not, and a clearing device for, when it has been judged that a received cell includes a reset bit, clearing the number indicated by the second judging device.

According to the above construction, priority data is inserted into an idle cell and transmission of thus occupied cells are continued until the first selected window has been attained, and after the first selected window has been attained, idle cells are transmitted without user data being inserted thereinto. On the other hand, non-priority data is inserted into a released cell and transmission of thus occupied cells are continued until the second selected window has been attained. Furthermore, released cells can be transmitted by transforming idle cells thereinto within the third window even if the first selected window has been attained.

According to such construction, not all the idle cells received by a node are transformed into released cells to transmit data, thereby ensuring lower nodes to occupy idle cells.

Moreover, the first window is assigned so that the sum of each ratio of transmission capacity for the first window and of transmission capacity for released cells to be transmitted to the entire windows on the ring network can not exceed 1. This can prevent occurrence of Cell flow interruption or data transmission delay.

The third object of this invention can be achieved by the third judging device comprising the following devices:

A managing timer for generating time-outs per unit time, the number of the time-outs corresponding to the third window.

A counter for third window for counting up by 1 every time a time-out is generated and for counting down by 1 every time a released packet is transmitted if the first window has been attained.

A third window judging circuit for judging the attainment of the third selected window, from the counter for third window being 0.

According to the above construction, the entire window bands on the ring network is divided into priority band assigned to priority data to be transmitted by using idle cells within the first selected window, which is allocated to each node, and non-priority band assigned to non-priority data to be transmitted by using released cells within the second selected window.

Thus, in the priority band, data transmission delay is reduced and the occurrence of cell flow interruption is prevented. Although those problems may not be prevented in the non-priority band, data is efficiently distributed to unused parts in the priority band.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3 is a table showing the correlation among the states of ring cells, windows and a transmitting buffer.

FIG. 4 is the format of a ring cell used in Embodiment 1 of this invention.

FIG. 5 is a block diagram showing a general construction of the data transmission system of Embodiment 1.

FIG. 7 is a table showing the correlation among the states of ring cells, first and second windows and a transmitting buffer of Embodiment 1.

FIG. 11 is a table showing the relation between input and output in the managing circuit 390 in the access control unit 109 of Embodiment 1.

FIG. 15 is a table showing the correlation among the states of ring cells, first and second windows and a transmitting buffer of Embodiment 2.

FIG. 21 is a table showing the correlation among the states of ring cells, first and second windows and a transmitting buffer of Embodiment 3.

DESCRIPTION OF THE PREFERRED EMBODIMENTS

<EMBODIMENT 1>

The ring network, and the data transmission system used therein according to this embodiment are described as follows.

Figure 1:
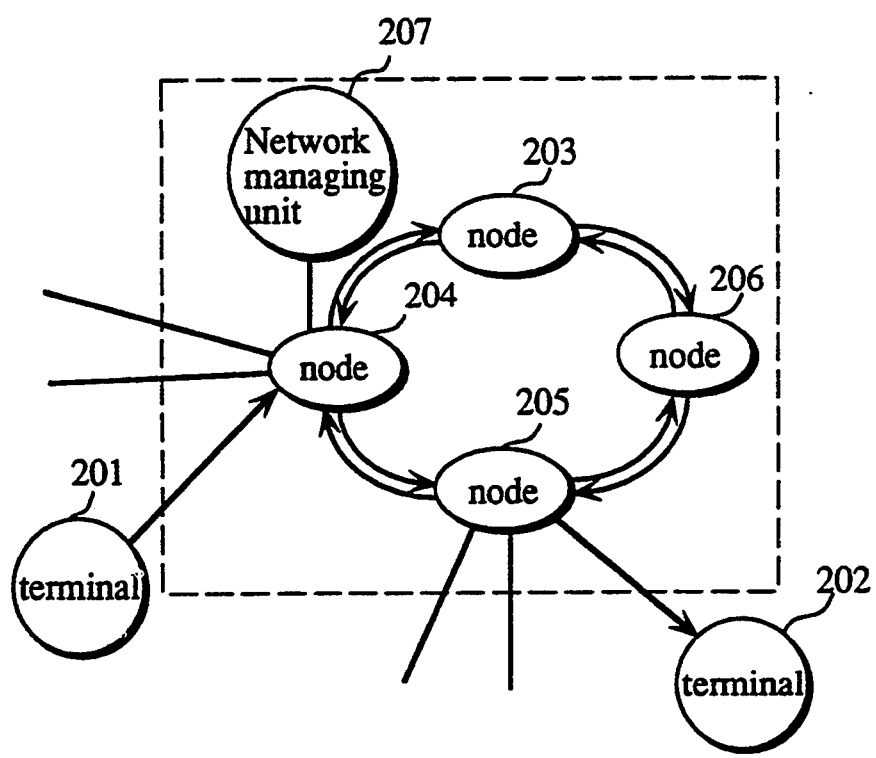
FIG. 1 is the configuration of a conventional ring packet transmission network.
Figure 2:
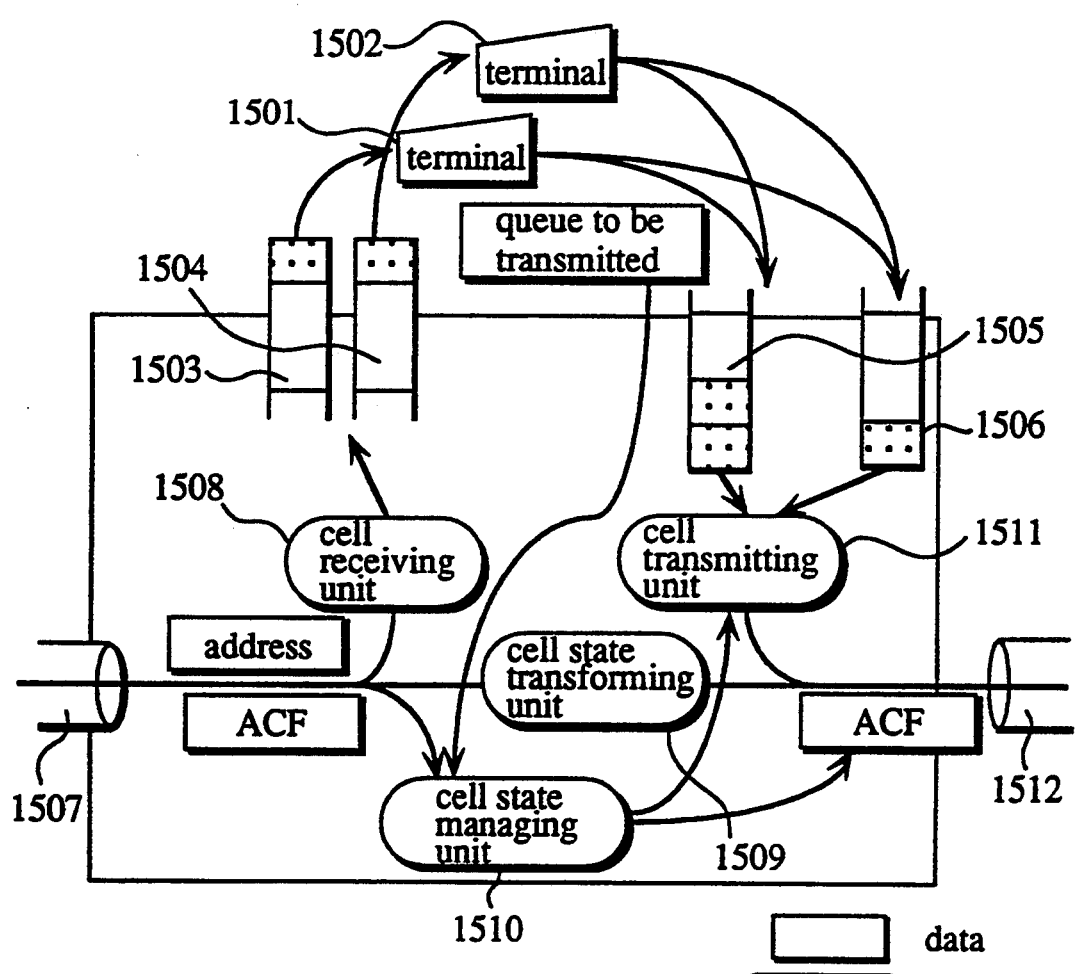
FIG. 2 is the block diagram of a node used in the conventional packet transmission network.

The general construction of the ring network is not detailed because it is the same as that of the conventional network shown in FIG. 1 except for the configuration of nodes 203–206.

The ring cells with fixed lengths traveling on the transmission paths are each composed of a 5-byte header and a pay load carrying 48-bit user information. The format of such ring cell is shown in FIG. 4, where the header is composed of 12-bit access control information (ACF), an 8-bit header error control (HEC), and a 16-bit ring virtual channel number (RVCN) including an access node address (ANA), logical channel number (LCN), and 4-bit undefined bits. The ACF includes 3-bit status (ST) bits indicating the states of the cell. The states may be "idle", "occupied", "released", and "reset", which are discriminated by bit patterns unique to each state.

The configuration of one of the nodes 203–206 is described as follows with reference to FIG. 5.

The node receives ring cells through a cell input unit 101.

A cell receiving unit 102 analyzes the header of a ring cell received through the cell input unit 101; if the ring cell is in the occupied state and having a destination address of its own, user data is taken out from the ring cell.

A receiving buffer 103 stores user data taken out by the cell receiving unit 102.

A terminal 104 is associated with the node.

A transmitting buffer 105 stores user data sent from the terminal 104.

A cell transmitting unit 106 first provides user data present in the transmitting buffer 105 with necessary procedure such as designating a destination and then transmit it as a ring cell.

The ring cell is transmitted from the node onto one of the transmission paths through a cell output unit 107.

A cell state transforming unit 108 transforms the state of a ring cell inputted from the cell receiving unit 102 as follows, responding to the state of the ring cell and a destination address contained in the cell, and sends the transformed ring cell to the cell transmitting unit 106.

(1) An idle cell is a cell including no user data. Each node may occupy the cell with data of its terminal if the node has not exhausted its assigned window (a first window). When such cell arrives, the cell state transforming unit 108 keeps the state of the cell unchanged.

(2) An occupied cell is a cell including user data. When such cell arrives, the cell state transforming unit 108 forwards the cell as it is if it is bound for another node, and otherwise the cell receiving unit 102 receives user data therefrom and then the cell state transforming unit 108 transforms the ring cell into an idle cell.

(3) A released cell is a cell generated by a node which has no data to be transmitted and has not been exhausted the first window. When such cell arrives, if it is bound for the node which generated the cell and the node is in the hunt mode, then the cell state transforming unit 108 transforms the ring cell into an idle cell. If it is bound for the node which generated the cell and the node is in the normal mode, then the ring cell is transformed into a reset cell. Otherwise the state of the cell is unchanged.

(4) A reset cell is a cell transmitted by a node which received a ring cell in the released state and bound for that node. When such cell arrives, the cell state transforming unit 108 transforms the ring cell into an idle ring cell if it is bound for the node, and otherwise keeps the state of the cell unchanged.

An access control unit 109 controls transformation of cell states and data transmission, responding to the states of the first and second windows and the presence or absence of data to be transmitted.

Figure 6:
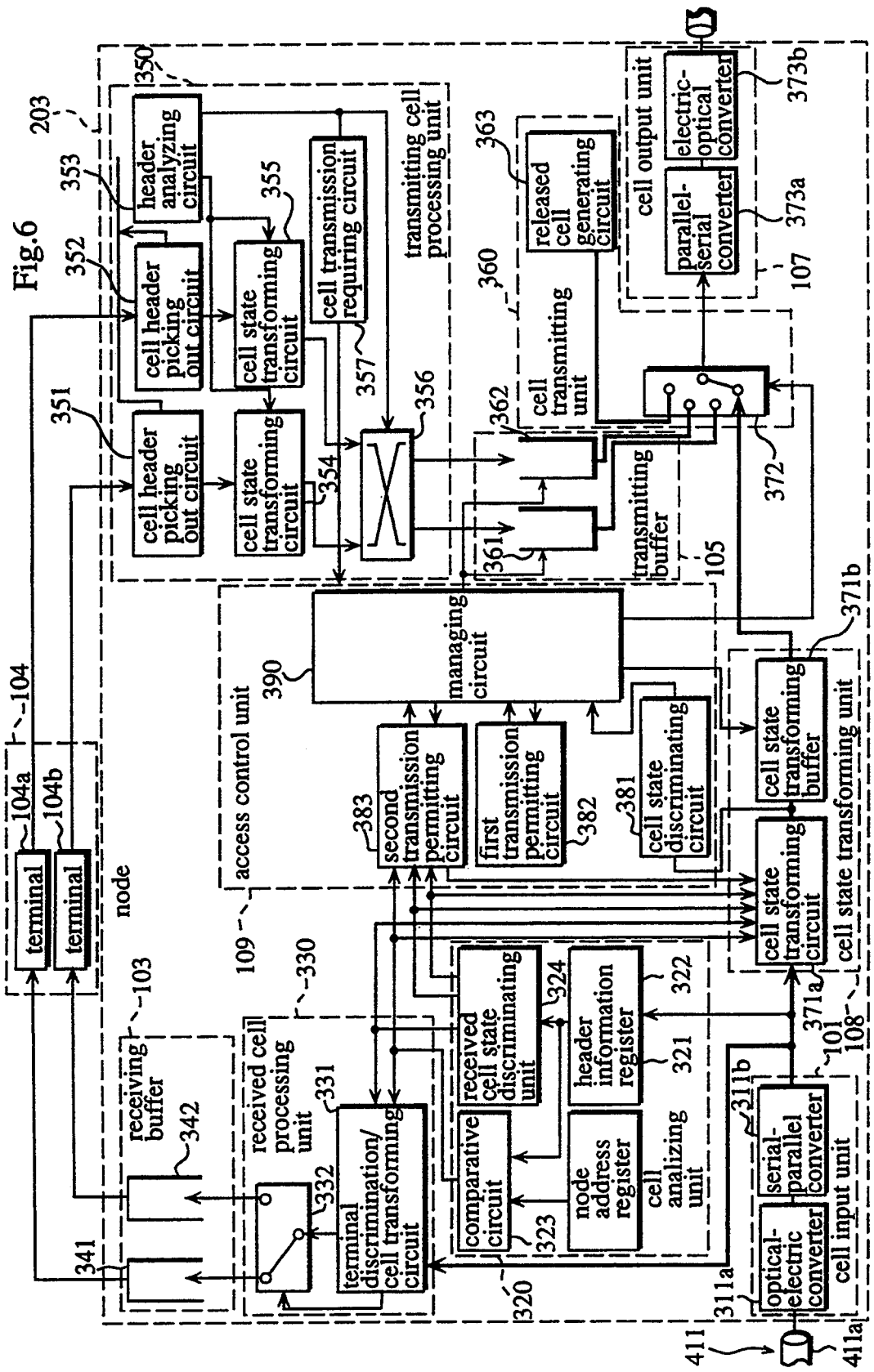
FIG. 6 is a block diagram showing a more detailed construction of the data transmission system of Embodiment 1.

The configuration of the nodes 203–206 shown in FIG. 5 is further detailed in FIG. 6. In FIG. 6, a cell analyzing unit 320 and a received cell processing unit 330 correspond to the cell receiving unit 102 of FIG. 5, and a transmitting cell processing unit 350 and a cell transmitting unit 360 correspond to the cell transmitting unit 106 of FIG. 5. The nodes 203–206 are interconnected via a pair of ring transmission paths in which ring cells circulate in opposite directions. Since each of the transmission paths has the same construction, the following description is for one of them. The description concerning a control unit and other units provided to each node to communicate with a band managing unit 405 is omitted.

In the figure, the cell input unit 101 mainly composed of an optical-electric converter 311a and a serial-parallel converter 311b recognizes arrival of individual ring cells by a signal from one of the transmission paths and outputs a responding parallel signal, for example, per 1 byte.

The cell analyzing unit 320 analyzes the header of a ring cell received through the cell input unit 101 and recognizes the state of the ring cell and a destination address. The unit 320 is composed of a node address register 321, a header information register 322, a comparative circuit 323, and a received cell state discriminating unit 324. The node address register 321 stores an address identifying the node, The header information register 322 stores the header of a received ring cell. The comparative circuit 323 compares the node address of the header stored in the header information register 322 with its own node address and outputs a signal indicating whether the addresses are identical or not. The received cell state discriminating unit 324 decodes ST of the header to discriminate the state of the ring cell and outputs a signal responsive to the state.

The received cell processing unit 330 is composed of a terminal discriminating/cell state transforming circuit 331 and a cell distributing circuit 332 The terminal discriminating cell state transforming circuit 331, when the cell analyzing/unit 320 detects a ring cell to be bound for the node and in the occupied state, outputs a signal informing the discriminated state, based on the terminal address contained in the cell. And at the same time, the unit 331 transforms the ring cell into a terminal cell. The cell distributing circuit 332 distributes terminal cells to the receiving buffers 341 and 342, which transmit the terminal cells to the terminals 104a and 104b, based on the signal informing the discriminated state.

The receiving buffer 103 is provided mainly to accommodate the speed of transmitting ring cells on the ring transmission paths and the speed of transmitting user data between terminals and the ring transmission paths, the former speed being higher. The capacity of the buffer 103 is determined statistically considering the dispersion of data rate. Terminal cells stored in the receiving buffers 341 and 342 are transferred to the terminals 104a and 104b through an unillustrated circuit.

Thus, received ring cells are transferred to the terminals 104a and 104b according to the terminal addresses. This allows each node to be associated with several terminals, thereby enhancing data throughput.

The transmitting cell processing unit 350 transforms terminal cells sent from the terminals 104a and 104b into ring cells, and then stores the ring cells to either the transmitting buffer 361 or 362, responding to their quality classes of communication. The unit 350 is composed of header picking out circuits 351 and 352, a header analyzing unit 353, cell state transforming circuits 354 and 355, a cell distributing circuit 356, and a cell transmission requiring circuit 357. The header picking out circuits 351 and 352 pick out the headers of terminal cells sent from the terminals 104a and 104b. The header analyzing unit 353 has a table (not shown) showing the relationship between destination terminals and the nodes associated with the destination terminals. The unit 353 generates a destination node address and discriminates the quality class of the cell based on the table and the header, which is picked out by the cell header picking out circuits 351 and 352. The cell state transforming circuits 354 and 355 add the destination node address generated by the cell header analyzing unit 353 and its ST to the header of a terminal cell in order to transform the cell into an occupied ring cell. The cell distributing circuit 356 stores ring cells outputted from the cell state transforming circuits 354 and 355 to the transmitting buffers 361 or 362, under direction of the header analyzing circuit 353. When the transmitting buffers 361 and 362 have ring cells to be transmitted, the cell transmission requiring unit 357 outputs signals Q1 and Q2 respectively indicating the presence of ring cells in the buffers 361 and 362.

Data to be transmitted is divided into two classes having different qualities of communication. If the transmitting buffer 361 has priority over the other buffer 362, ring cells present in the transmitting buffer 361 are transmitted with priority. To be more precise, two windows are provided: a first window indicates the number of idle cells that each node may transmit, and a second window indicates the number of released cells each node may transmit. The ring cells stored in the transmitting buffer 361 are to be transmitted with priority within the first window band, while those stored in the transmitting buffer 362 are to be transmitted within the second window band.

The released cell generating circuit 363 generates ring cells in the released states whose headers contain the node addresses.

Figure 8:
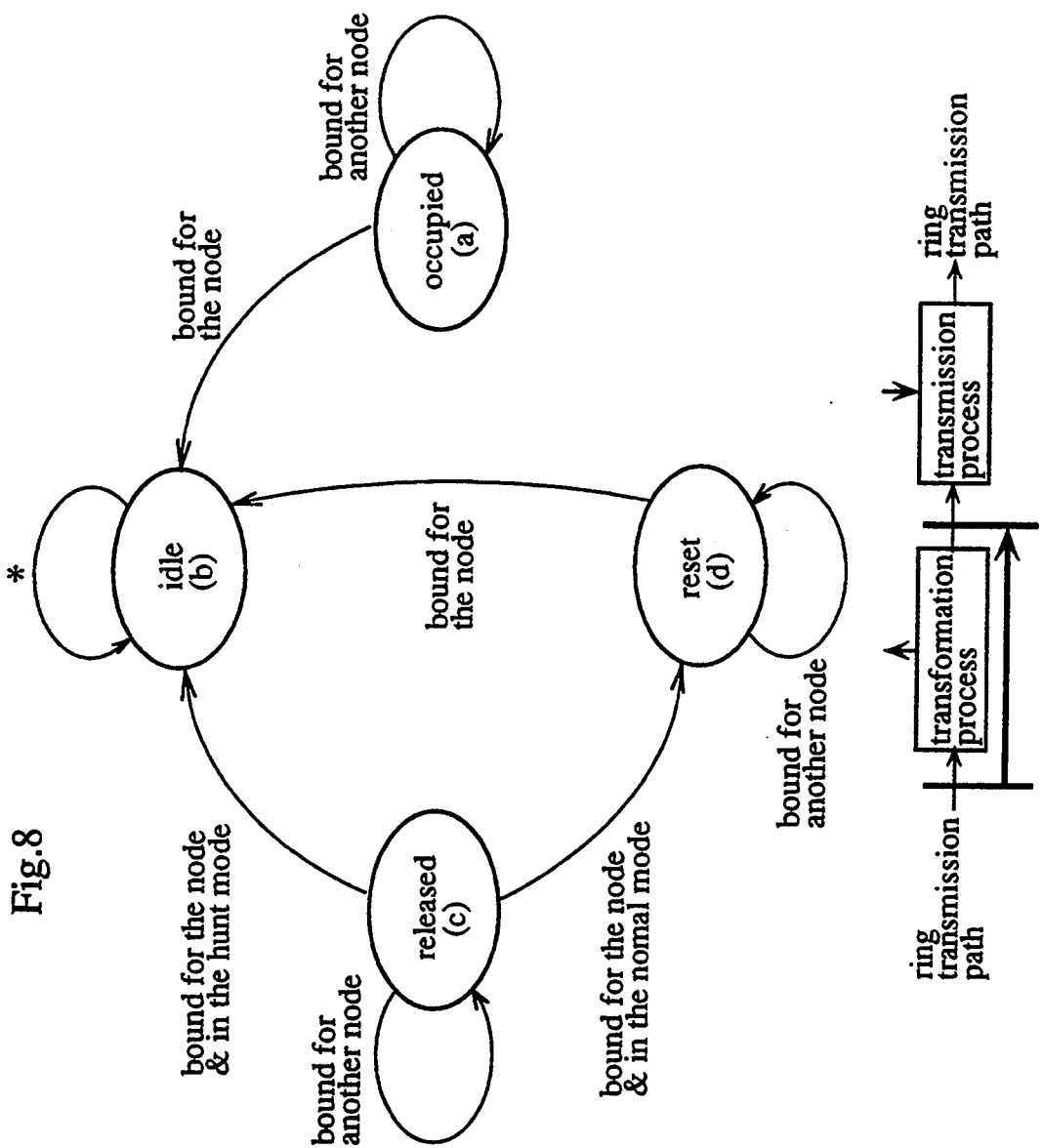
FIG. 8 is a diagram showing the state transition of ring cells after they are received by a node until they reach to the cell state transforming unit of Embodiment 1.

The cell state transforming unit 108 is composed of a cell state transforming circuit 371a and a cell state transforming buffer 371b. The cell state transforming circuit 371a transforms the states of ring cells under direction of the cell analyzing unit 320. A more detailed description of the cell state transformation being executed by the cell state transforming circuit 371a is shown in FIGS. 7 and 8. In the figure, the symbol "&" means "and", "#" means "or", and "[ ]" describes the operation of the node. The reference characters (a)–(d) correspond to those in FIG. 8.

As shown in FIGS. 7 and 8, when a node receives a ring cell under conditions of either (1), (2), and (3), the received ring cell is transformed into an idle cell.
(1) bound for the node and in the occupied state,
(2) bound for the node which generated the cell and in the released state, and the node is in the hunt mode,
(3) bound for the node which generated the cell and in the reset state.

The received ring cell is transformed into a reset cell when it is
(4) bound for the node which generated the cell, in the released state, and the node is in normal mode.

The received ring cell is outputted with no change of its state when it is
(5) bound for another node or in the idle state.

The cell state transforming process is divided into two steps to simplify the process. This allows some types of ring cells to be transformed into only either idle cells or reset cells. As a result, in the access control unit 109, the destination node addresses can be ignored or the idle ring cell generation circuit becomes dispensable. This division is not crucial.

The cell state transforming buffer 371b temporarily stores ring cells outputted from the cell state transforming circuit 371a.

The selector 372 selects a ring cell outputted from any one of the cell state transforming unit 108, the transmitting buffers 361 and 362, and the released cell generation circuit 363, under direction of the access control unit 109.

The cell output unit 107 mainly composed of a parallel-serial converter 373a and an electric-optical converter 373b transmits the ring cells selected by the selector 372 in the form of optical signals onto the transmission paths.

The access control unit 109 determines ring cells to be transmitted, responding to the state of a ring cell outputted from the cell state transforming circuit 371a, the queue lengths of the transmitting buffers 361 and 362 (hereinafter referred to as Q1 and Q2), and the presence or absence of remaining amount of the first and second windows (hereinafter referred to as W1 and W2), thereby controlling the selector 372 and other units. The access control circuit 109 is composed of a transformed cell state discriminating circuit 381, a first transmission permitting circuit 382, a second transmission permitting circuit 383, and a managing circuit 390. The transformed cell state discriminating circuit 381 discriminates the state of a ring cell to be either idle, released, occupied or reset by decoding the ST of the ring cell being outputted from the cell state transforming circuit 371a.

Figure 9:
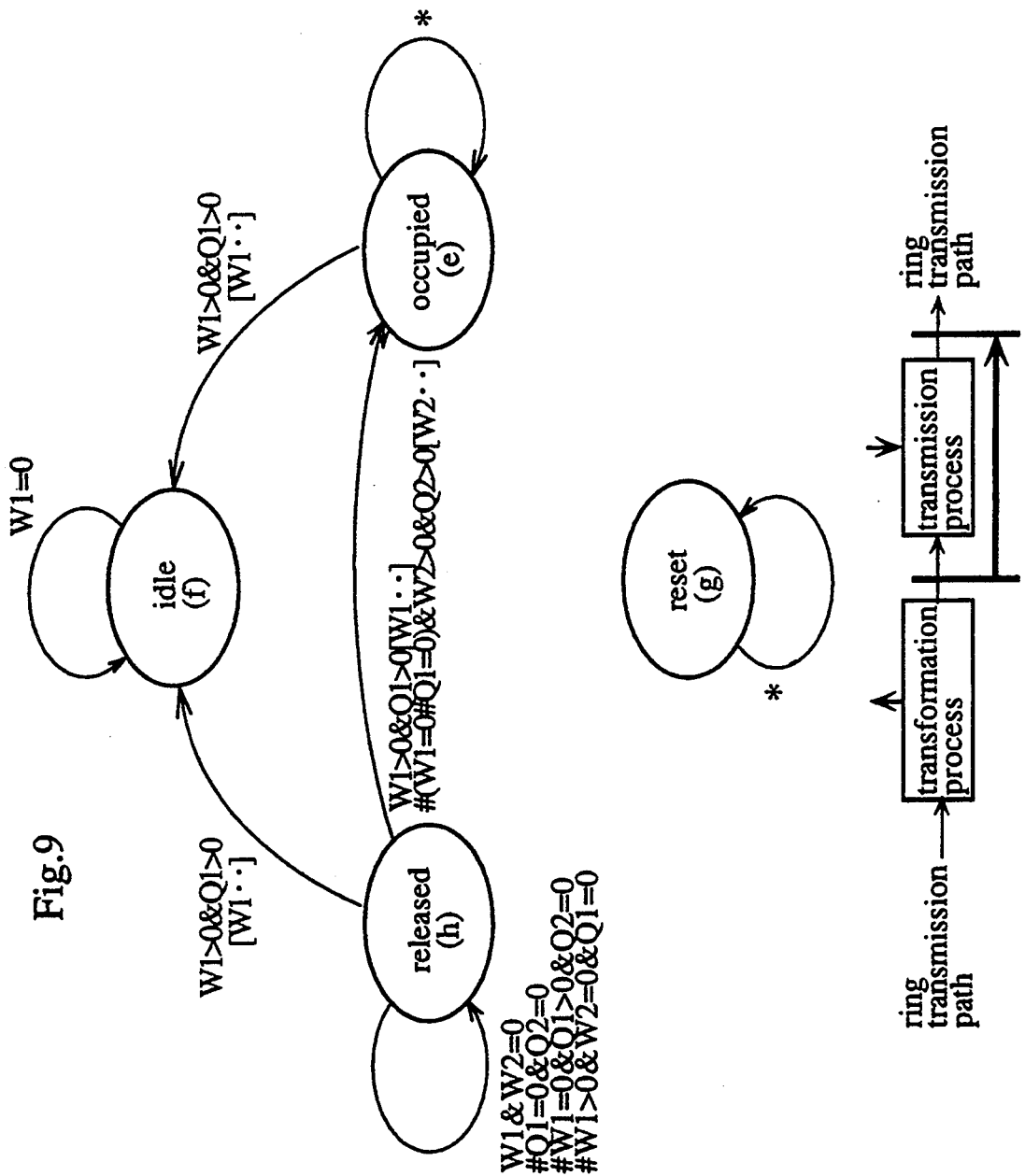
FIG. 9 is a diagram showing the state transition of the ring cells until they are outputted from the cell state transforming unit of Embodiment 1.

Under direction of the managing circuit 390 to transmit Q1, the first transmission permitting circuit 382, if it has not exhausted its first window, directs priority data transmission, decrementing the first window band by one. Under direction of the managing circuit 390 to transmit Q2, the second transmission permitting circuit 383, if it has not exhausted its second window, directs non-priority data transmission, decrementing the second window band by one. The managing circuit 390 controls the cell state transforming unit 108, the transmitting buffers 361 and 362, the released cell generation circuit 363, and the selector 372, responding to the results of the transformed cell state discriminating circuit 381 and the presence or absence of W1 and W2. FIG. 9 shows the states of the ring cells transformed in the cell state transforming unit 108 and those of the ring cells to be transmitted onto the ring transmission paths under control of the access control unit 109. In the figure, the symbol "&" means "and", "#" means "or", "*" means "don't care", and "[ ]" describes the operation of the node. The reference characters (a)–(d) correspond to those in FIG. 7.

Figure 10:
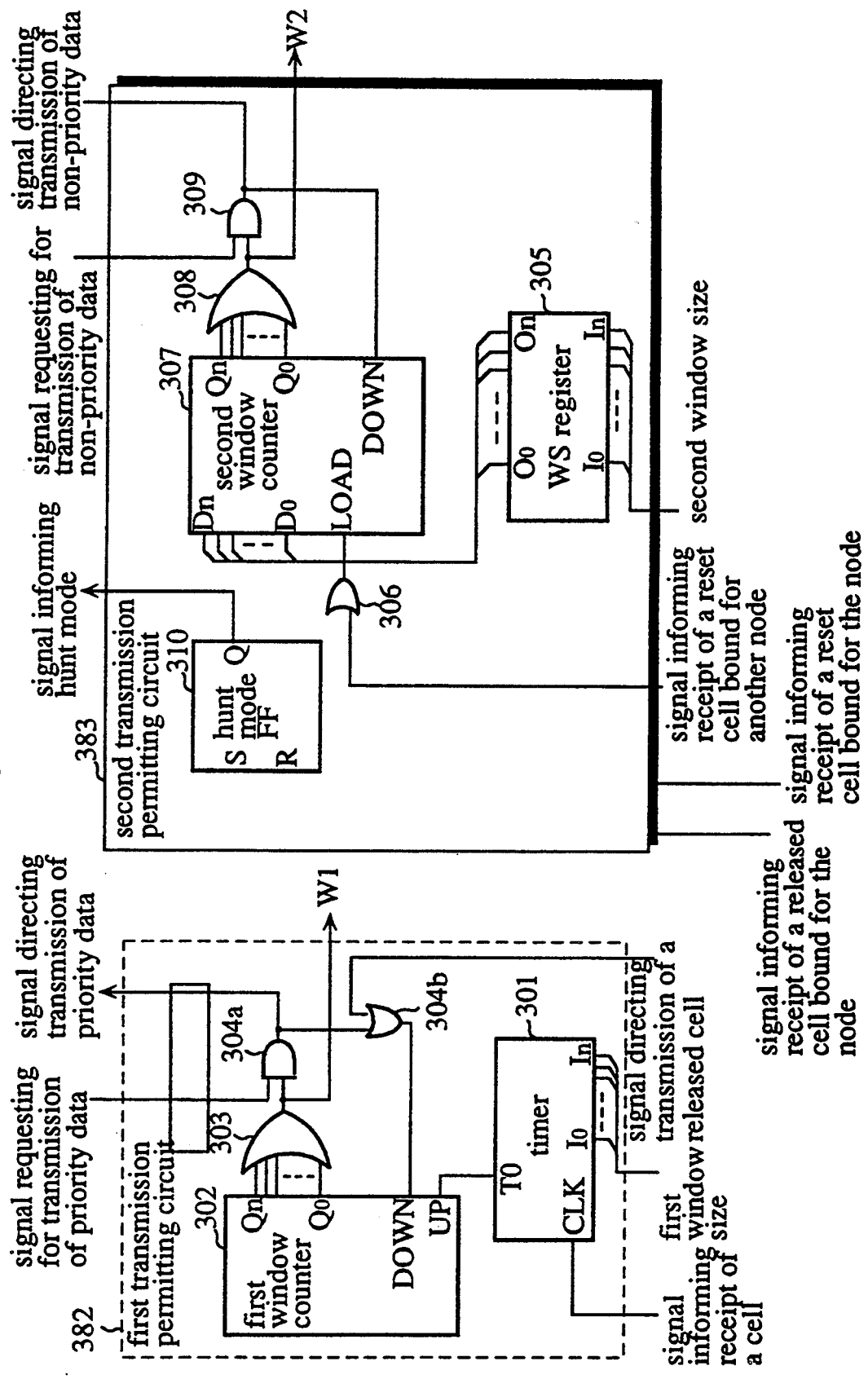
FIG. 10 is a diagram showing the detailed construction of the first and second transmission permitting circuits 382 and 383 in the access control unit 109 of Embodiment 1.

The constructions of the first and second transmission permitting circuits 382 and 383 are detailed in FIG. 10.

The first transmission permitting circuit 382 is composed of a timer 301, a first window counter 302, an OR gate 303, and an AND gate 304.

A signal informing receipt of a ring cell is inputted to the timer 301 in the form of a clock. The timer 301 generates a time-out every time the number of the cells received reaches the first window band assigned to the node. In other words, the timer generates a time-out in every period corresponding to the inverse of the window band.

The first window counter 302 counts up every time the timer 301 generates a time-out and counts down every time the signal which directs to transmit priority data in the transmitting buffer 361 becomes active.

The OR gate 303 outputs a signal W1 indicating the presence or absence of W1, or indicating the counter value of the first window counter 302 is 0 or a positive integer.

The AND gate 304 outputs the signal which directs to transmit priority data if its first window has not been exhausted (W1 is active) when the managing circuit 390 outputs a signal which requests to transmit priority data.

A WS register 305 stores the setting value of the second window band.

An OR gate 306 receives a signal indicative of receipt of a released cell bound for the node which generated the cell and another signal indicative of receipt of a reset cell bound for another node, and in turn outputs the OR of these signals.

A second window counter 307, when the signal of the OR gate 306 becomes active, has the setting value of the second window held in the WS register 305 written therein, and counts down every time a signal which directs to transmit nonpriority data present in the transmission buffer 362 becomes active. Adding the setting value of the second window of the WS register 305 means the second window band is reset. If a ring cell in the released state and bound for the node which generates the cell is transformed into a ring cell in the reset state, this means that no node on the ring has data to be transmitted by occupying a ring cell in the released state. Receipt of a ring cell bound for another node and in the reset state means the same. The second window counter 307 is used to control released ring cells by the access control unit 109: when the second window has not been exhausted, released ring cells are used, and otherwise their use is prohibited.

An OR gate 308 outputs a signal W2 indicating the presence or absence of W2, or indicating the counter value of the second window counter 307 is 0 or a positive integer.

An AND gate 309 outputs a signal which directs transmission of non-priority data when the managing circuit 390 directs transmission of Q2, if the second window has not been exhausted.

A hunt mode indication flip flop 310 is set when the node receives a ring cell in the released state bound for itself, and outputs a signal indicating that the node is in the hunt mode. On the other hand, the FF 310 is reset when the node receives a ring cell in the reset state bound for itself, and outputs a signal indicating the node is in the normal mode. The hunt mode is a period starting when a reset cell bound for itself is transmitted from a node until the cell returns to the originating node after traveling all the way around the ring. This mode is provided to avoid transmitting reset state ring cells repeatedly. The normal mode is the mode other than the hunt mode.

The Q1 signal and Q2 signal indicate that the transmitting buffers 361 and 362 have data to be transmitted and are outputted therefrom to the managing circuit 390.

The W1 signal and W2 signal indicate the states of the first and second windows and are outputted from the first and second transmission permitting circuits 382 and 383 to the managing circuit 390.

The signal requesting for transmission of priority data present in the transmitting buffer 361 is outputted from the managing circuit 390 to the first transmission permitting circuit 382.

The signal requesting the transmission of nonpriority data present in the transmitting buffer 362 is outputted from the managing circuit 390 to the first transmission permitting circuit 382.

The signal directing data transmission using the first window band is outputted from the first transmission permitting circuit 382 to the cell transmitting unit 360.

The signal directing data transmission using the second window band is outputted from the second transmission permitting circuit 383 to the cell transmitting unit 360.

The signal informing receipt of a reset ring cell bound for another node is outputted from the cell analyzing unit 320 to the second transmission permitting circuit 383.

The signal informing receipt of a reset ring cell bound for the node which generated the cell is outputted from the cell analyzing unit 320 to the second transmission permitting circuit 383.

FIG. 11 is a logical table showing the input/output relationship of the managing circuit 390 shown in FIG. 6. In the table, the cell state transformation shown in FIGS. 7 and 9 are rearranged by focusing on W1, Q1 W2, and Q2. All of "W1", "Q1", "W2", "Q2", "occupied", "idle", "released", "reset" represent signals to be inputted to the managing circuit 390. The signals "W1", "W2", "Q1", and "Q2" are equal to the above-mentioned "W1 signal", "W2 signal", "Q1 signal", and "Q2 signal" respectively.

The left-side column shows 16 possible cases caused by combining any of the four signals. Every "1" in the rows of W1 and W2 means the window counter value is 1 or more, and "0" means the value is zero. Every "1" in the rows of Q1 and Q2 means the transmitting buffer has a ring cell to be transmitted and "0" means it does not.

The right-side column shows the outputs of the managing circuit 390. Every "transformation" means to direct the cell state transforming buffer 371b to output a ring cell whose state was transformed by the cell state transforming circuit 371a. Every "occupied (Q1)" means to direct the transmitting buffer 361 to output an occupied ring cell. Every "occupied (Q2)" means to direct the transmitting buffer 362 to output an occupied ring cell. Every "released" means to direct the released cell generating circuit 363 to output a released ring cell. Every "-" means there is no input combination (it is impossible that W2=0 and the cell outputted from the cell state transforming circuit 371a is in the reset state at the same time).

Figure 12:
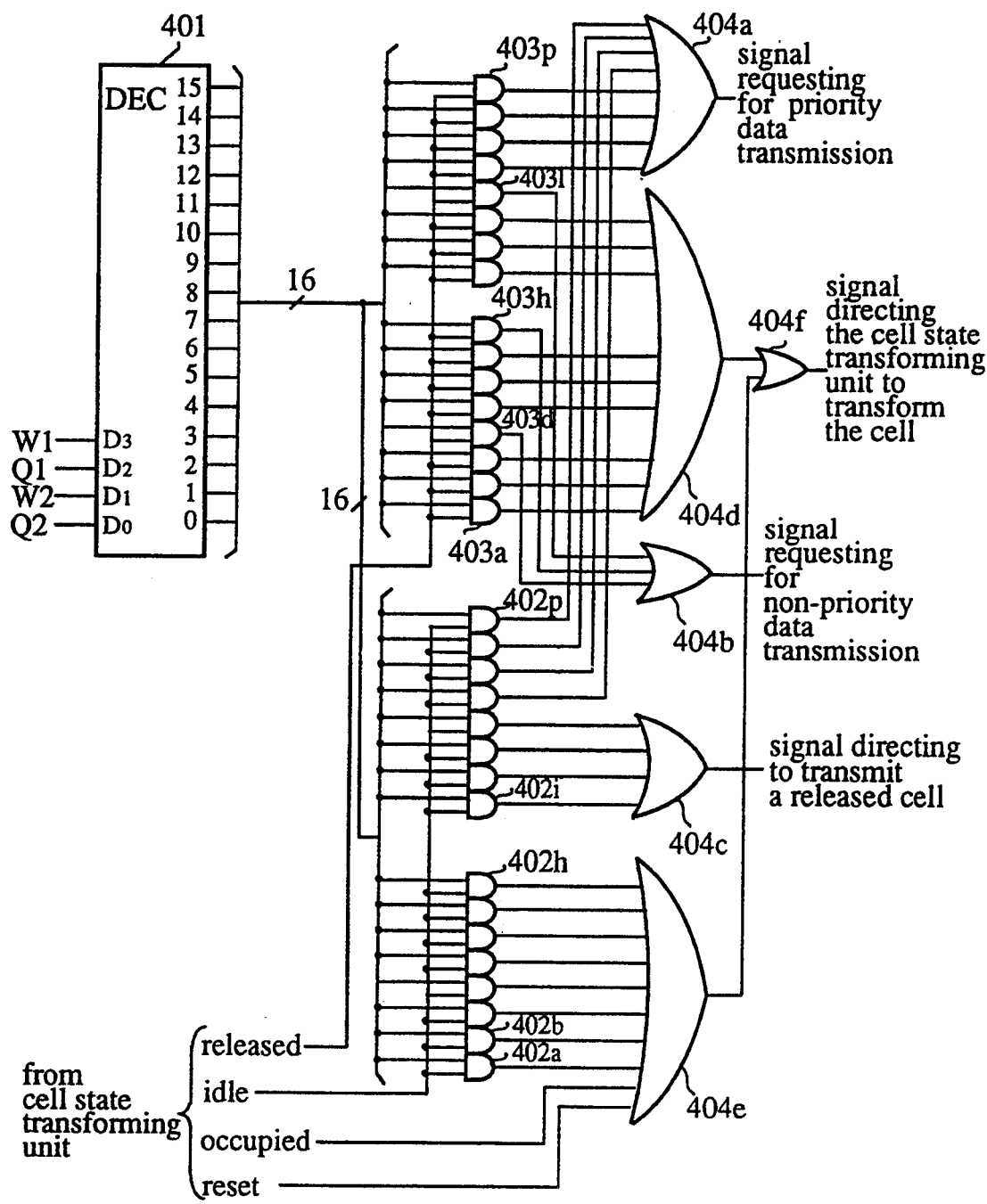
FIG. 12 is a diagram showing the detailed construction of the managing circuit 390 of Embodiment 1.

FIG. 12 shows the detailed Construction of the managing circuit 390 composed of a decoder 401, AND gates 402a–p, AND gates 403a–p, and OR gates 404a–f. The input signals W1, Q1, W2, Q2, idle, released, occupied, and reset correspond to those in FIG. 11. The last four signals are inputted from the cell state transforming unit 108 and indicate the outputs of the cell state transforming circuit 371a. One of these signals becomes active exclusively.

The decoder 401 decodes signals W1, Q1, W2, and Q2 as received. As a result, one of the 16 signals corresponding to the 16 combinations shown in FIG. 11 becomes active. For example, if these four signals: W1, Q1, W2, and Q2 are "0000", then only the signal 0 becomes active. In the same manner, if the signals are "0111", then only the signal 7 becomes active.

Only one of the AND gates 403a–p becomes active responding to the combination of W1, Q1, W2, and Q2 when the cell from the cell state transforming circuit 371a is in the released state. For example, if "W1, Q1, W2, Q2" are "0000", then only the output of the AND gate 403a becomes active.

The OR gate 404a receives one of the outputs of the AND gate 402a–p and the AND gates 403a–p that corresponds to "occupied (Q1)" of FIG. 11. Therefore, the logical OR is outputted as a priority data request signal for requesting the first transmission permitting circuit 382 to output a ring cell in the occupied state present in the transmitting buffer 361 via the selector 372.

The OR gate 404b receives one of the outputs of the AND gate 402a–p and the AND gates 403a–p that corresponds to "occupied (Q2)" of FIG. 11. Therefore, the logical OR is outputted as a non-priority data request signal for requesting the second transmission permitting circuit 383 to output a ring cell in the occupied state present in the transmitting buffer 362 via the selector 372.

The OR gate 404c receives one of the outputs of the AND gate 402a–p and the AND gates 403a–p that corresponds to "released" of FIG. 11. Therefore, the logical OR is outputted as a signal requesting the released cell generating circuit 363 to output a ring cell in the released state via the selector 372.

The OR gates 404d–f receives one of the outputs of the AND gate 402a–p and the AND gates 403a–p that corresponds to "transformation" of FIG. 11 and further an occupied state signal and a reset state signal. Therefore, the logical OR is outputted as a signal requesting the cell state transforming buffer 371b to output a ring cell transformed by the cell state transforming circuit 371a via the selector 372.

The operation of the above-constructed ring network and nodes used therein according to this invention is described as follows.

A ring cell inputted through the cell input unit 101 is transferred to the received cell processing unit 330 and the cell state transforming circuit 371a, and at the same time, its header is sent to the cell analyzing unit 320. The cell analyzing unit 320 analyzes the header of the cell. If the cell is found to be bound for the node which generated the cell and in the occupied state, user information in the pay load of the ring cell is changed to a terminal cell by the received cell processing unit 330 and stored to the receiving buffer 103. Otherwise, the cell is not stored in the receiving buffer 103.

At the same time, the cell state transforming circuit 371a discriminates a destination node and the state of the inputted ring cell and transforms the state. More precisely, the cell state transforming unit 108 transforms cell states as shown in FIGS. 7 and 8. The following (a)–(d) correspond to those in FIG. 7.

(a) When a received cell is in the occupied state, the cell is transformed into an idle cell if it is bound for the node which generated the cell, and otherwise its state is kept unchanged.

(b) When a received cell is in the idle state, its state is kept unchanged. The address is not refereed to.

(c) When a received cell is in the released state and bound for the node which generated the cell, the subsequent operation differs according to whether the node is in the normal mode or hunt mode.

In the normal mode, the cell state transforming circuit 371a transforms the ring cell into a reset cell. At this moment, the cell analyzing unit 320 outputs a signal informing receipt of a released cell bound for the node which generated the cell shown in FIG. 10, thereby the second window counter 307 is initialized (the WS held in the WA register 305 is loaded). At the same time, the hunt mode indication register 310 is set by this signal outputted from the unit 320 and the node goes into the hunt mode.

In the hunt mode, the cell state transforming circuit 371a transforms a released cell bound for the node which generated the cell into an idle cell. The hunt mode is provided for avoiding to transmit a reset cell repeatedly when a released cell bound for the node which generate the cell is received after a reset cell is sent out. The operation in the hunt mode differs from that in the normal mode in the case of (c) only.

On the other hand, when a received cell is in the released state and bound for another node, its state is kept unchanged.

(d) When a received cell is in the reset state and bound for the node which generated the cell, the cell is changed to an idle cell. At this moment the node is in the hunt mode and the cell analyzing unit 320 outputs a signal informing receipt of a reset cell bound for the node which generated the cell shown in FIG. 10. As a result, the hunt mode indication FF is reset and the node returns to the normal mode.

Furthermore, when a received cell is in the reset state and bound for anther node, its state is kept unchanged in order to make the reset cell travel all the way around the ring. At this moment, the cell analyzing unit 320 outputs a signal informing receipt of a reset cell bound for another node shown in FIG. 10. As a result, the second window counter 307 is initialized (the WS held in the WS register 305 is loaded).

The ring cells whose state are transformed respectively as in (a)–(d) are temporarily held in the transforming buffer 371b.

Further, according to the results of the cell state transforming circuit 371a, the access control unit 109 determines, responding to the states of the first and second windows and the presence or absence of data in the transmitting buffer, whether it should cause the cell state transforming buffer 371b to transmit a ring cell to the cell output unit 107, whether it should cause the transmitting buffers 361 and 362 to transmit an occupied cell having data sent from the transmitting cell processing unit 350 to the cell output unit 107, and whether it should cause the released cell generating circuit 363 to transmit a released cell to the cell output unit 107. The more detailed control of the access control unit 109 is described as follows with reference to FIG. 7.

The subsequent operation of the access control unit 109 varies responding to the state of a cell transformed by the cell state transforming unit 108, the presence or absence of W1, W2, Q1, and Q2, so that the following cases of (e)–(h) are provided, which correspond to those in FIG. 7.

(e) When the state of a ring cell transformed by the cell state transforming unit 108 is the occupied state, the cell state transforming unit 108 forwards the cell as it is to the cell output unit 107. The reason the state of the cell is kept unchanged is that the cell is bound for another node. To be more precise, the occupied state signal is active in the managing circuit 390 shown in FIG. 12, so that the signal directing the cell state transforming unit 108 to transmit the ring cell becomes active. At this moment, since the idle state signal and the released state signal are inactive, the AND gates 402a–p and the AND gates 403a–p all become logical 0 inactive and the output signals of the OR gates 404a–c become inactive. When the signal directing the cell state transforming unit to transmit a ring cell in the released state becomes active, the ring cell present in the cell state transforming buffer 371b is transmitted to the ring via the selector 372 and the cell output unit 107.

(f) When the state of a ring cell transformed by the cell state transforming unit 108 is the idle state, the same operation as in the conventional data transmission systems is carried out, regardless of the value of W2.

First, the access control unit 109 causes the cell transmitting unit 106 to transmit an occupied cell, provided that the first window band has not been exhausted and the transmitting buffer 105 has data (Wi>0, Q>0). At this moment, the first window counter 302 counts down by 1 (W1 becomes W1-1). To be more precise, in the managing circuit 390 in FIG. 12, one of the AND gates 402m–p and 403m–p that corresponds to "occupied (Q1)" in FIG. 11 becomes a logical 1 (active), and a signal to request for priority data transmission is outputted from the OR gate 404a. This signal is inputted to the AND gate 304 in the first transmission permitting circuit 382 shown in FIG. 10. Since W1 of the first window counter 302 has not been exhausted, the AND gate 304 outputs a signal requesting for priority data transmission. This signal makes the first window counter 302 count down by 1, and an occupied cell stored in the transmitting buffer 361 be transmitted onto the ring via the selector 372 and the cell output unit 107.

When W1>0 and Q=0, a released cell bound for the node which generated the cell is transmitted from the cell transmitting unit 106 to the cell output unit 107. At this moment, the first window counter 302 counts down by one (W1 becomes W1-1). To be more precise, in the managing circuit 390 shown in FIG. 12, one of the AND gates 402$i$-$l$ that corresponds to "released" in FIG. 11 becomes active, and a signal directing to transmit of a released cell is outputted from the OR gate 404c. This signal is inputted to the OR gate 304b of the first transmission permitting circuit 382 shown in FIG. 10. As a result, W1 of the first window counter 302 is counted down by 1, and a released cell generated by the released cell generating circuit is transmitted onto the ring via the selector 372 and the cell output unit 107.

Finally, when W1=0 and Q=0, an idle cell is transmitted as it is from the cell state transforming unit 108 to the cell output unit 107. At this moment, the values of the first and second window counters 302 and 307 do not change. To be more precise, a signal directing the cell state transforming unit to transmit the ring cell is outputted from the OR gates 404$a$-$f$. As a result, a ring cell in the cell state transforming buffer 371b is transmitted onto the ring via the selector 372 and the cell output unit 107.

(g) When the state of a ring cell transformed by the cell state transforming unit 108 is the reset state, the reset cell is forwarded as it is to the cell output unit 107. If the reset cell is bound for the node which generated the cell, the hunt mode indication FF 310 is already reset and the node is already put in the hunt mode, and the second window counter 303 is already reset according to the Signal informing receipt of a released state cell bound for the node which generated the cell, the signal being sent from the cell analyzing unit 320.

If the reset cell is bound for another node, the second window counter 307 is already reset by the signal informing the receipt of the reset cell bound for another node sent from the cell analyzing unit 320 as described in (c). Since the reset state signal in the managing circuit 390 shown in FIG. 12 is active, the signal directing the cell state transforming unit to transmit the ring cell becomes logical 1 through the OR gates 404$e$-$f$. At this moment, the idle state signal and the released state signal are both logical 0, so that the AND gates 402$a$-$p$ and 403$a$-$p$ all become logical 0, and other do not. Then, when the signal to direct the cell state transforming unit to transmit the ring cell becomes logical 0, the ring cells present in the cell state transforming buffer 371b is transmitted onto the ring via the selector 372 and the cell output unit 107.

(h) When the state of a ring cell transformed by the cell state transforming unit 108 is the released state, the subsequent operation varies depending on the combination of the values of W1, W2, Q1, and Q2.

First, when W1>0 and Q1>0, a ring cell in the occupied state present in the transmitting buffer 361 is transmitted onto the ring via the selector 372 and the cell output unit 107.

When either W1=0 or Q1=0, and both W2>0 and Q2>0, a ring cell in the occupied state present in the transmitting buffer 362 is transmitted. To be more precise, in the management circuit 390, all of W2, Q2, and released state signal are logical 1, so that one of the AND gates 403$d$, 403$h$, and 403$l$ becomes logical 1 and a signal requesting to transmit nonpriority data is outputted from the OR gate 404b. This signal is inputted to the AND gate 309 in the second transmission permitting circuit 383 shown in FIG. 10. Since W2 of the second window counter 307 has not been exhausted, the AND gate 309 outputs a signal directing transmission of nonpriority data. This signal makes the first window counter 307 count down by 1 and makes a ring cell in the occupied state present in the transmitting buffer 362 be transmitted onto the ring via the selector 372 and the cell output unit 107.

Finally, when either W1=0 Or Q1=0, and W2=0 and/or Q2=0, a cell whose state has been transformed by the cell state transforming unit 108 (a released cell in this case) is transmitted to the cell output unit 107. More precisely, as described in (g) above, the managing circuit 390 outputs a signal directing transmission of a ring cell. As a result, the ring cell in the cell state transforming buffer 371b is transmitted onto the transmission path via the selector 372 and the cell output unit 107. Even if W2=0 and Q2>0, the released cells corresponding to the WS of the second window band W2 are already exhausted, so that the use of such cell is prohibited and the right to use the cell is given to a lower node. Thus, fairness among all the nodes in the use of released cells is guaranteed.

As described hereinbefore, the state of each ring cell is transformed in two steps: first in the cell receiving process carried by the cell state transforming unit 108 and further in the cell transmitting process carried out by the control of the access control unit 109.

A received released cell is transmitted after being transformed into an occupied cell only when the W2 has not been exhausted (W2>0). As a result, data with priority is preferentially transmitted within the first window band. When there is no priority data, non-priority data is transmitted within the second window band. Introduction of the second window band and ring cells in the reset state guarantees fairness among all the nodes in the use of ring cells in the released state.

The distinction of priority data from non-priority data is not crucial and data may be distinguished in another aspect.

<EMBODIMENT 2>

Although in Embodiment 1, ring cells in the reset state are used to reset the second window counter 307 (to load WS), a reset operation can be directed by some bits indicating the presence or absence of a reset operation provided to each of a ring cell in the idle, occupied, and released states. In Embodiment 2, in place of using such ring cells in the reset state, a reset bit is provided which directs each cell in the idle, occupied, and released states to reset the second window counter.

Figure 13:
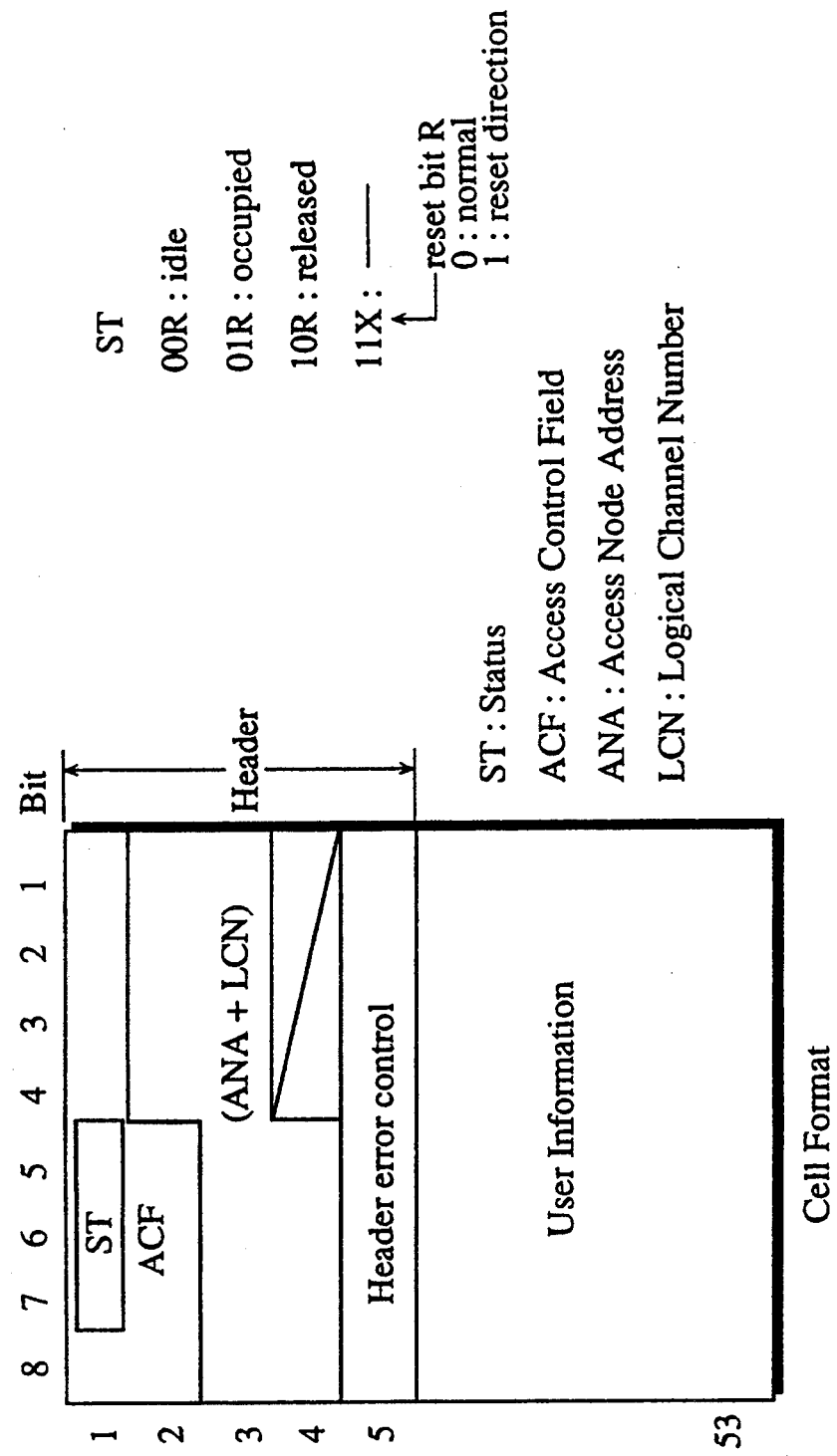
FIG. 13 is a format of a ring cell used in Embodiment 2 of this invention.

FIG. 13 shows the cell format of this embodiment. The feature common to that of Embodiment 1 is omitted. The distinctive aspect of this embodiment is the bit assignment of the ST consisting of 3 bits in the header. The high-order two bits indicate the state of a ring cell and the other one bit is a reset bit. Each of "00", "01", and "10" in the high-order two bits respectively indicate the idle state, the occupied state, and the released state. "11" is not used. The low-order one bit "1" or "0" respectively indicates that the second counter should be reset or should not. Thus, there can be three states and six types of ring cells according to the combination with the reset bit.

The circuit configuration of the node of this embodiment is detailed with reference to FIG. 14. The different aspects from that of Embodiment 1 only are described.

Figure 14:
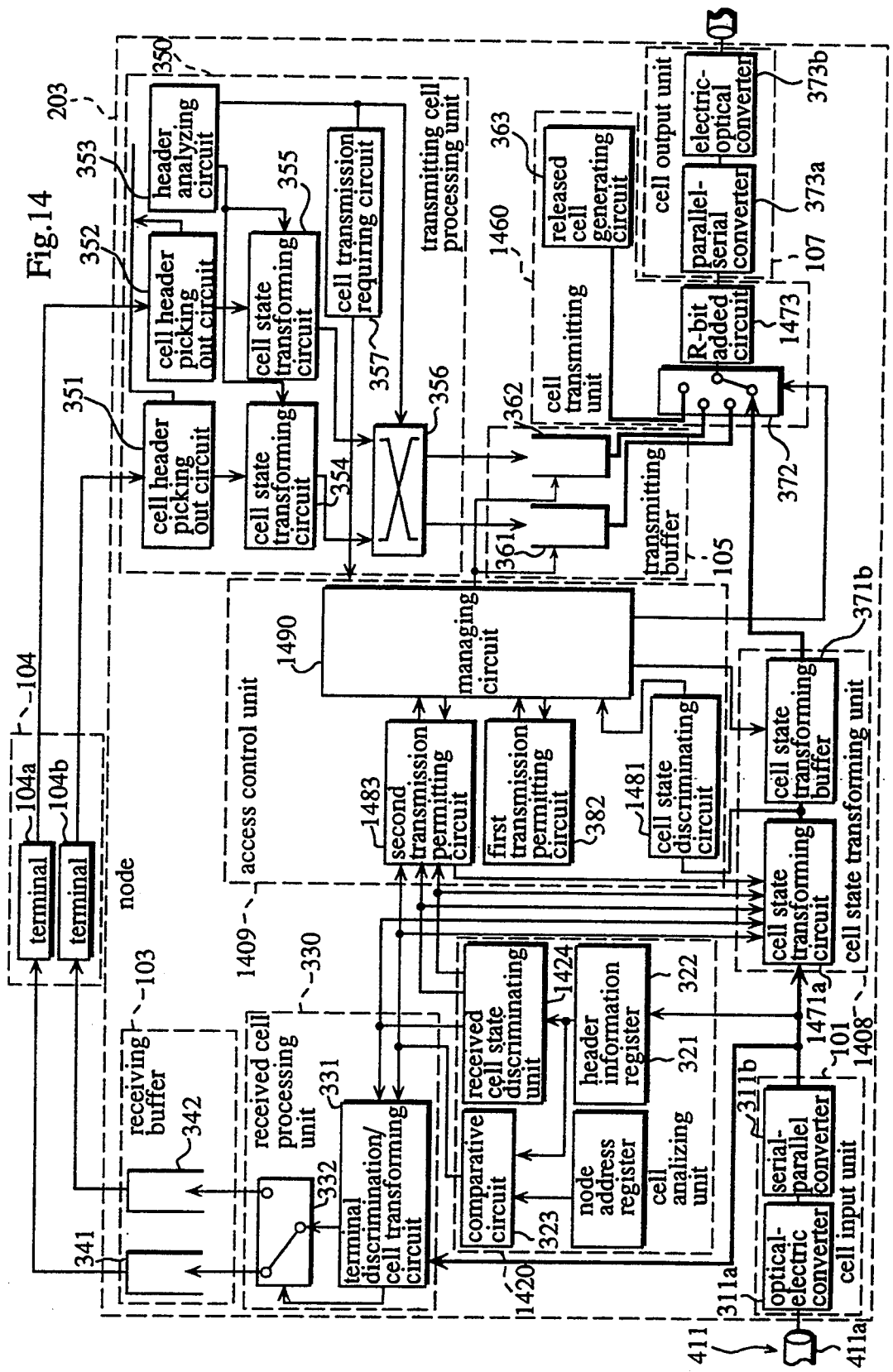
FIG. 14 is a block diagram showing the detailed construction of the data transmission system of Embodiment 2.

In FIG. 14, the cell analyzing unit 1420 only differs from the cell analyzing unit 320 of Embodiment 1 in having a received cell state discriminating unit 1424 in place of the received cell state discriminating unit 324. The received cell state discriminating unit 1424 decodes the high-order two bits of the ST in a ring cell and outputs a signal responding to the discriminated state, and further outputs a signal to direct resetting the ring cell according to whether the low bit is set or not.

Figure 16:
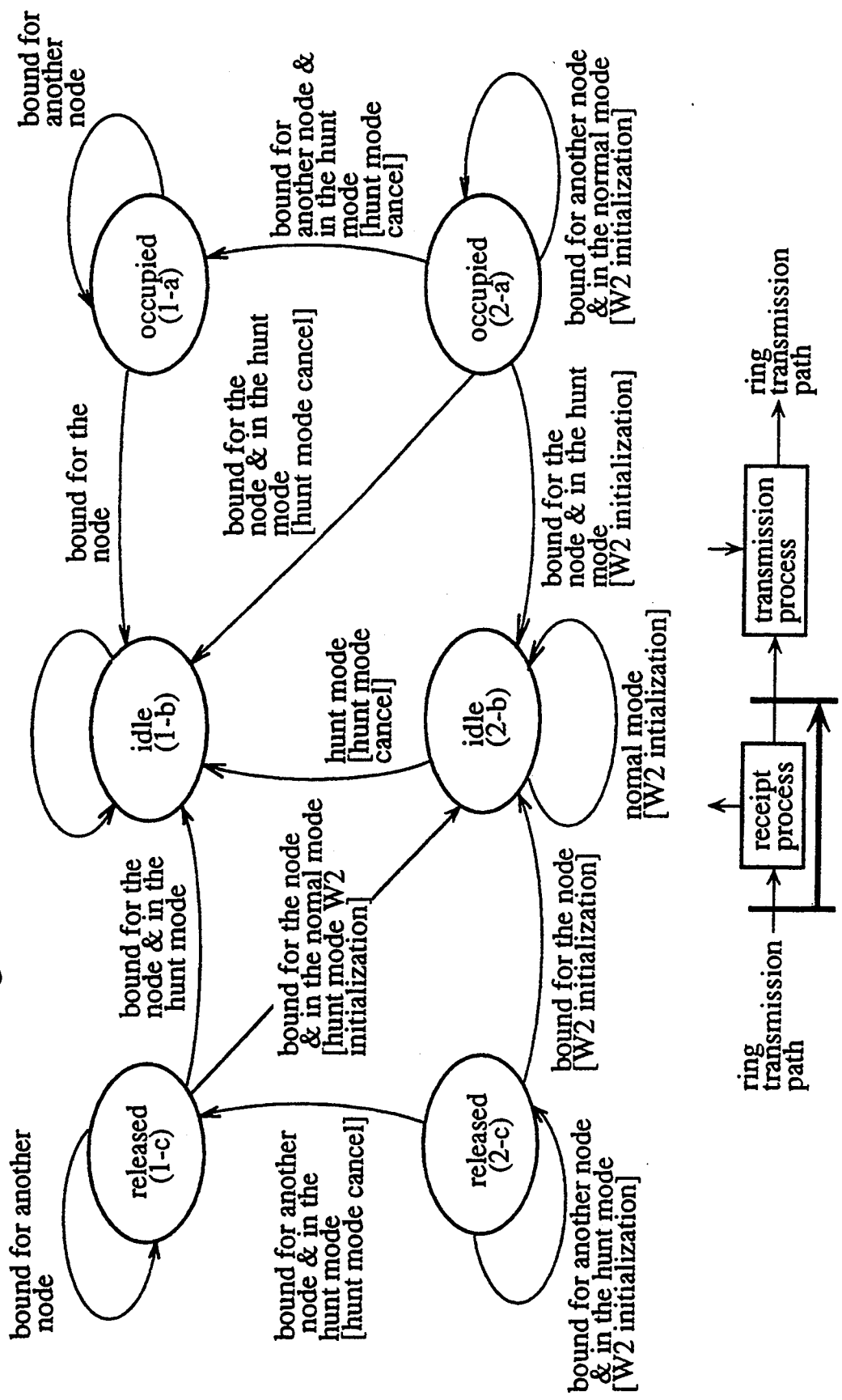
FIG. 16 is a diagram showing the state transition of ring cells after they are received by a node until they reach to the cell state transforming unit of Embodiment 2.

The cell state transforming unit 1408 only differs from the cell state transforming unit 108 in Embodiment 1 in having a cell state transforming circuit 1471a in place of the cell state transforming circuit 371a. The cell state transforming circuit 1471a transforms the state of a received ring cell responding to its state and a destination node. More detail of the cell state transformation is shown in FIG. 15, and the cell state transformation in the circuit 1471a is shown in FIG. 16. In the figure, the symbol "&" means "and", "#" means "or", and "[ ]" describes the operation of the node. The reference characters (1-a) through (2-c) in FIGS. 15 and 16 are common.

As shown in these figures, a received cell is transformed into an idle cell, when it is
(1) bound for the node which generated the cell and in the occupied state or
(2) bound for the node which generated the cell, in the released state, and the node is in the hunt mode.

A received cell is outputted with no state change, when it is
(3) bound for another node or in the idle state.

The access control unit 1409 only differs from the access control unit 109 of Embodiment 1 in having a transformed cell state discriminating circuit 1481, a second transmission permitting circuit 1483, and a managing circuit 1490 respectively in place of the transformed cell state discriminating circuit 381, the second transmission permitting circuit 383, and a managing circuit 390.

The transformed cell state discriminating circuit 1481 decodes the high-order two bits of the header in a ring cell being outputted from the cell state transforming circuit 1471a to discriminate whether the cell is in the idle, released, or occupied state.

Figure 18:
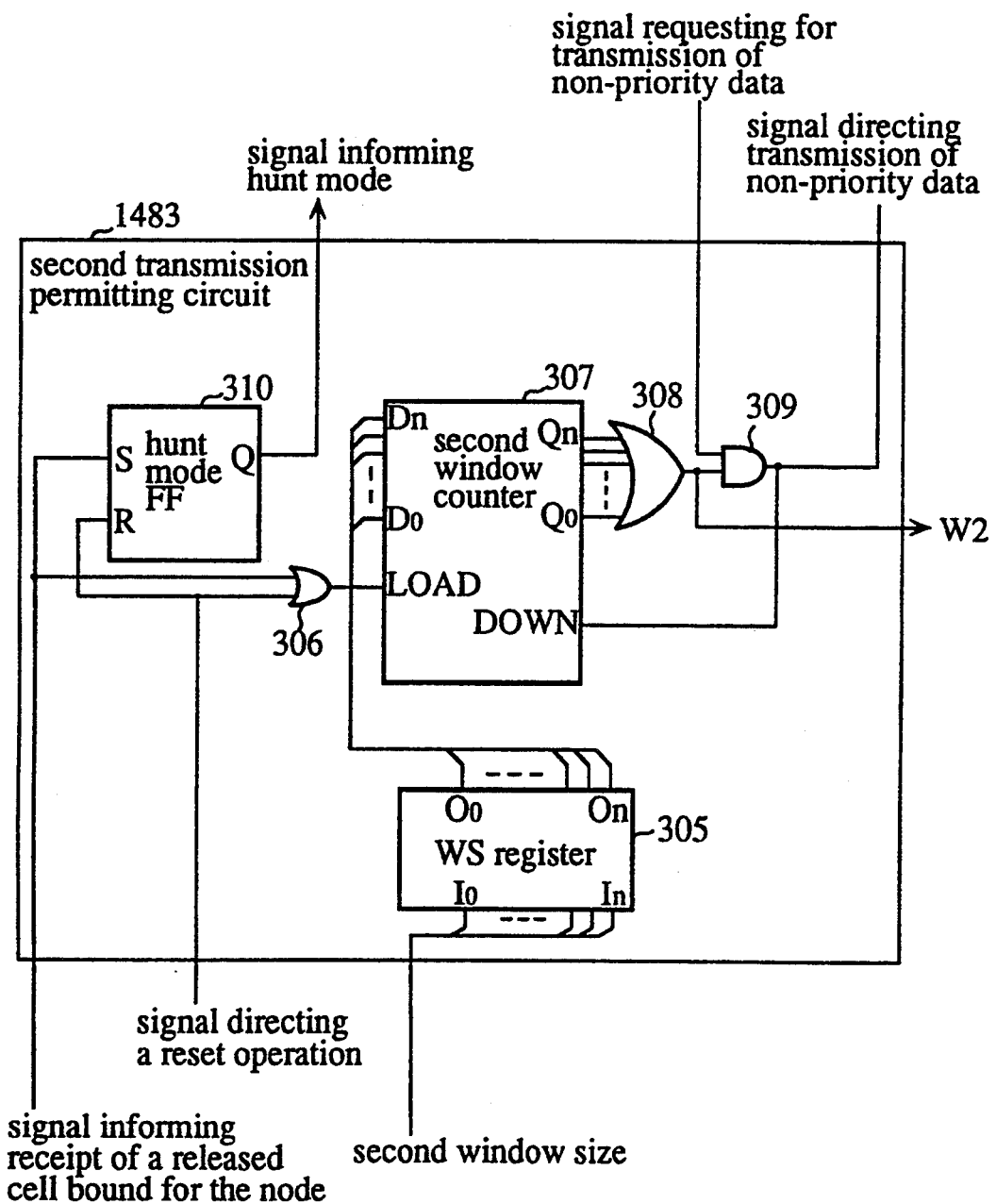
FIG. 18 is a diagram showing the detailed construction of the second transmission permitting circuit 1483 in the access control unit 1409 of Embodiment 2.

The circuit configuration of the second transmission permitting circuit 1483 is shown in FIG. 18, which only differs from the second transmission permitting circuit 383 shown in FIG. 10 in that signals inputted to the OR gate 306 and the hunt mode FF 310 are signals to direct a reset operation sent from the received cell state discriminating unit 1424. Therefore, when the node receives a released cell bound for itself, the hunt mode FF 310 is set and the node goes into a hunt mode. When the node receives a ring cell having a reset bit "1", the hunt mode FF 310 is reset and the node returns to the normal mode. This means that the hunt mode is a period starting from when a ring cell having a reset bit "1" is sent out until the node receives the cell.

Figure 19:
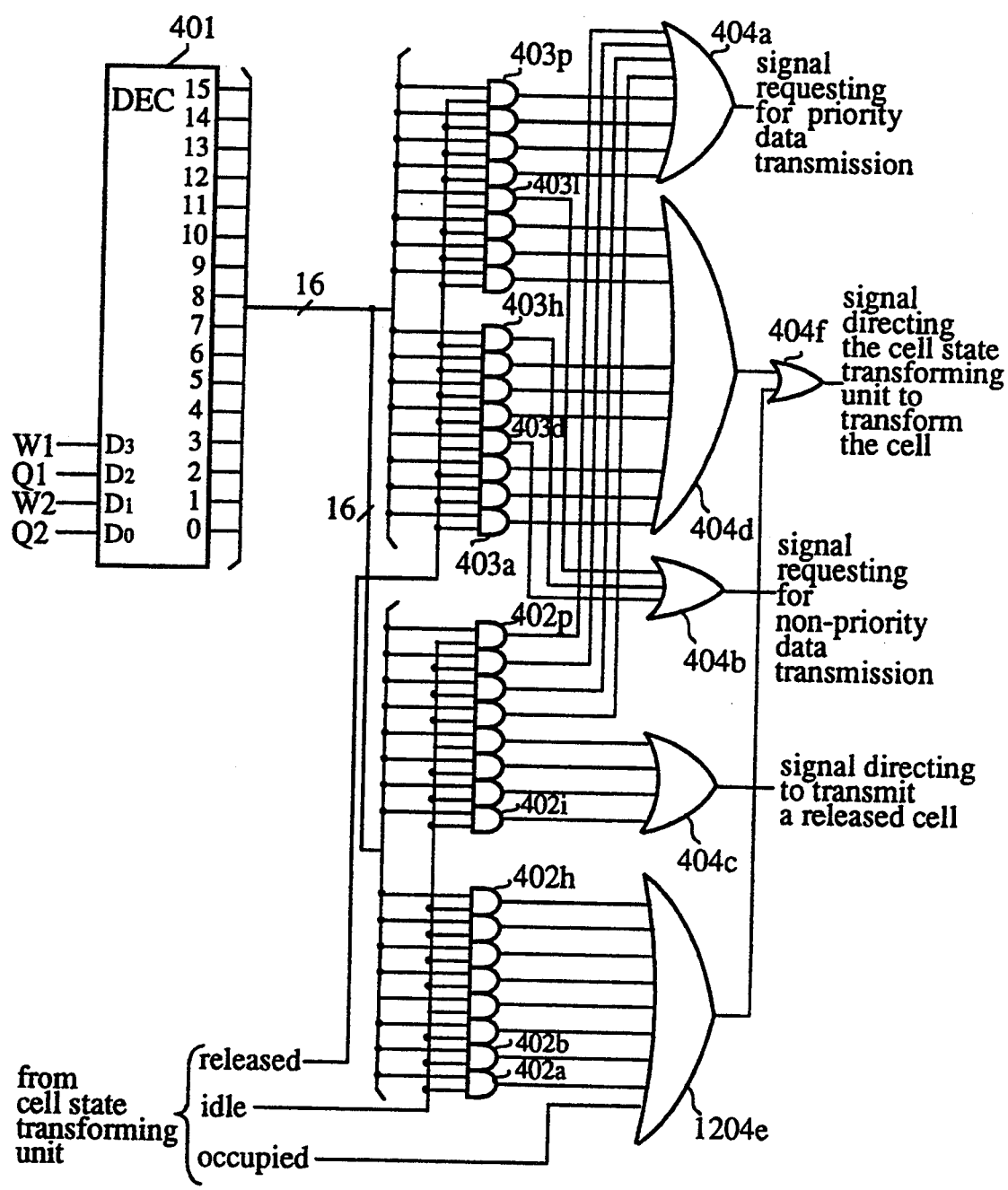
FIG. 19 is a diagram showing the detailed construction of the managing circuit 1490 of Embodiment 2.

The configuration of the managing circuit 1490 is shown in FIG. 19, which differs from the managing circuit 390 shown in FIG. 12 only in having an OR gate 1204e in place of the OR gate 404e. Since there is no signal indicating the reset state, one of the input signals of the OR gate 404e is eliminated. The other operational logic is the same as Embodiment 1.

The construction of a cell transmitting unit 1460 differs from that in Embodiment 1 in further having a R-bit added circuit 1473 next to the selector 372.

The R-bit added circuit 1473 receives a signal informing receipt of a released state cell sent from the received cell state discriminating unit 1424. If this signal is active and the node is in the normal mode, then the R-bit added circuit 1473 analyzes the header of a ring cell inputted from the selector 372, sets the reset bit to 1, and outputs the bit to the cell output unit 107. On the other hand, when the signal is inactive, or both active and the node is in the hunt mode, the ring cell inputted from the selector 372 is forwarded as it is to the cell output unit 107.

The operation of the above-constructed data transmission system of this embodiment is described as follows. The different aspects from that of Embodiment 1 are that there is no reset state cell and that a reset bit is provided to the ST.

The state of a ring cell, received through the cell input unit 101, is discriminated by the received cell state discriminating unit 1424, and a signal directing a reset operation of the ring cell is outputted to the second transmission permitting circuit 1483 responding to the value of the reset bit. In FIG. 18, if this signal is active, then the hunt mode FF 310 is reset (returned to the normal mode) and the second window counter 307 is reset (WS is loaded).

The cell state transforming circuit 1471a discriminates the state and a destination node of a ring cell inputted through the cell input unit 101 and transforms the state of the ring cell. Additional detail of the cell state transformation in the unit 1408 is shown in FIG. 15. The reference characters appearing below such as (1-a) correspond to those in FIGS. 15 and 16.

(1) When the reset bit of a received cell is logical 0

The state of the received cell can be in the occupied state (1-a), the idle state (1-b), or the released state (1-c), which are not described here because their operation is the same as (a)–(c) in Embodiment 1.

Since the signal directing the resetting of a ring cell sent from the received cell state discriminating unit 1424 is inactive, it does not affect either the mode of a node (hunt or normal) or the second window counter 307.

(2) When the reset bit of a received cell is logical 1

The state of a received cell can be in the occupied state (2-a), the idle state (2-b), or the released state (2-c), which are not described because their operation is the same as (a)–(c) in Embodiment 1.

Since the signal directing a reset operation sent from the received cell state discriminating unit 1424 is logical 0, the mode of the node is returned to the normal mode and the second window counter 307 is reset (WS is loaded).

Those ring cells whose states are transformed from (1-a) to (1-c) and from (2-a) to (2-c) are temporarily stored in the cell state transforming buffer 371b.

Figure 17:
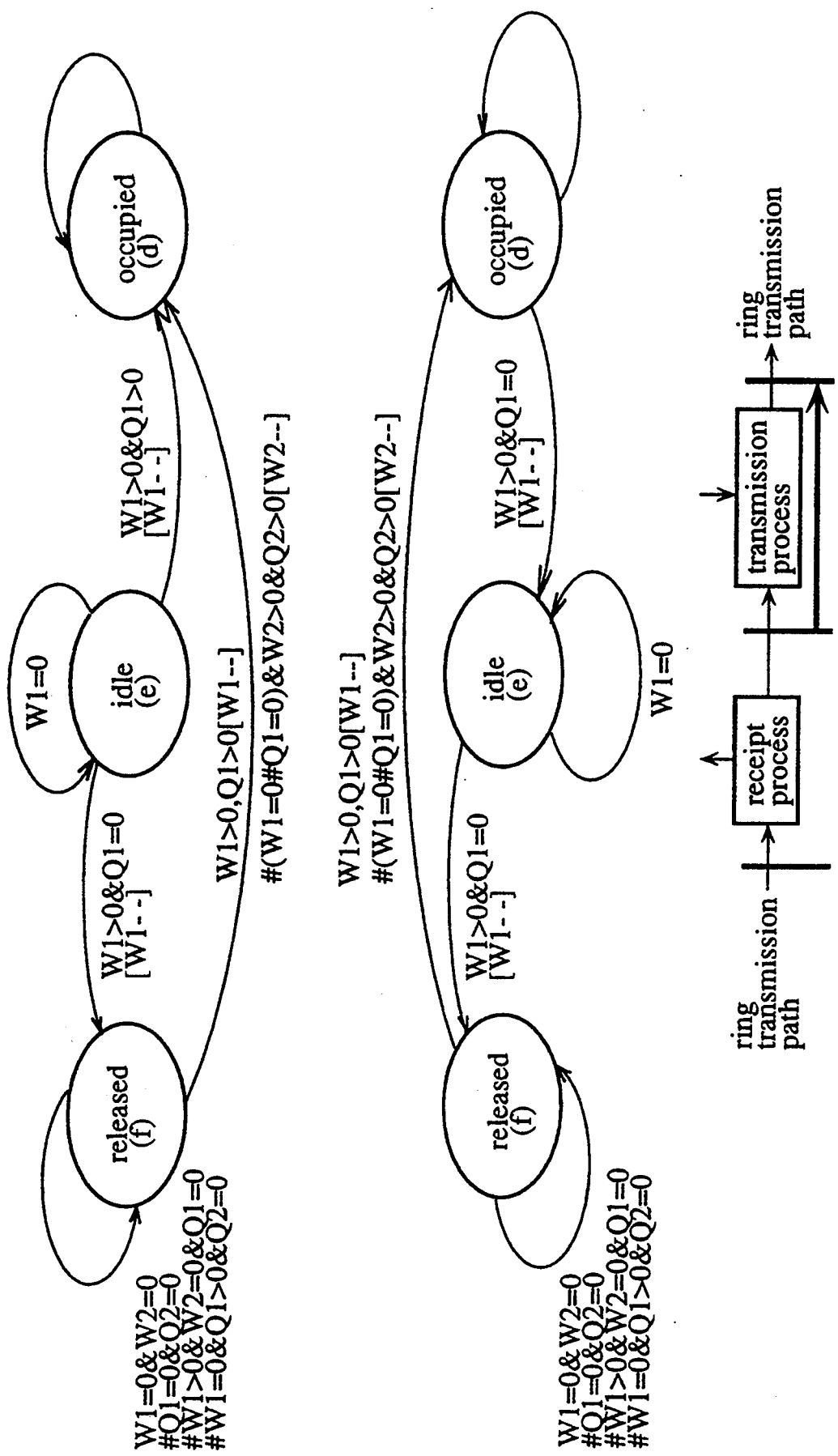
FIG. 17 is a diagram showing the state transition of the ring cells until they are outputted from the cell state transforming unit of Embodiment 2.

The access control unit 109 controls ring cell transmission as shown in FIGS. 15 and 17.

The subsequent operation of the access control unit 109 differs depending on the state of a ring cell which is transformed in the cell state transforming unit 108. The ring cell may be in the state of being (d) occupied, (e) idle, and (f) released. The operation of these (d)–(f) is the same as the results of the cell state transforming unit shown in FIG. 15.

The different aspect in the data transmission process controlled by the access control unit 1409 from that in Embodiment 1 is that the R-bit added circuit 1473 is in charge of processing a reset bit when a ring cell is transmitted via the selector 372 from one of the cell state transforming buffer 371b, the transmitting buffer 361, the transmitting buffer 362, and the released cell generating circuit 363. In other words, when the signal informing receipt of a released cell bound for the node which generated the cell sent from the received cell state discriminating unit 1424 is logical 1 and the node is in the normal mode, the R-bit added circuit 1473 detects the header of a ring cell inputted from the selector 372 and sets the reset bit in ST to "1" and outputs the cell to the cell output unit 107. This allows the setting of a reset bit to a ring cell in any of the occupied, idle, and released states.

As described hereinbefore, the direction of a resetting operation can be informed to each node independently of the data transmission by providing a reset bit to each ST of ring cells in these three states to direct a resetting operation of the second window counter. In other words, unlike the reset cell of Embodiment 1, there is no user information in the pay load, and ring cells are not used exclusively for directing a reset operation. This allows to direct a reset operation while transmitting data, thereby increasing the data throughput.

<EMBODIMENT 3>

Figure 20:
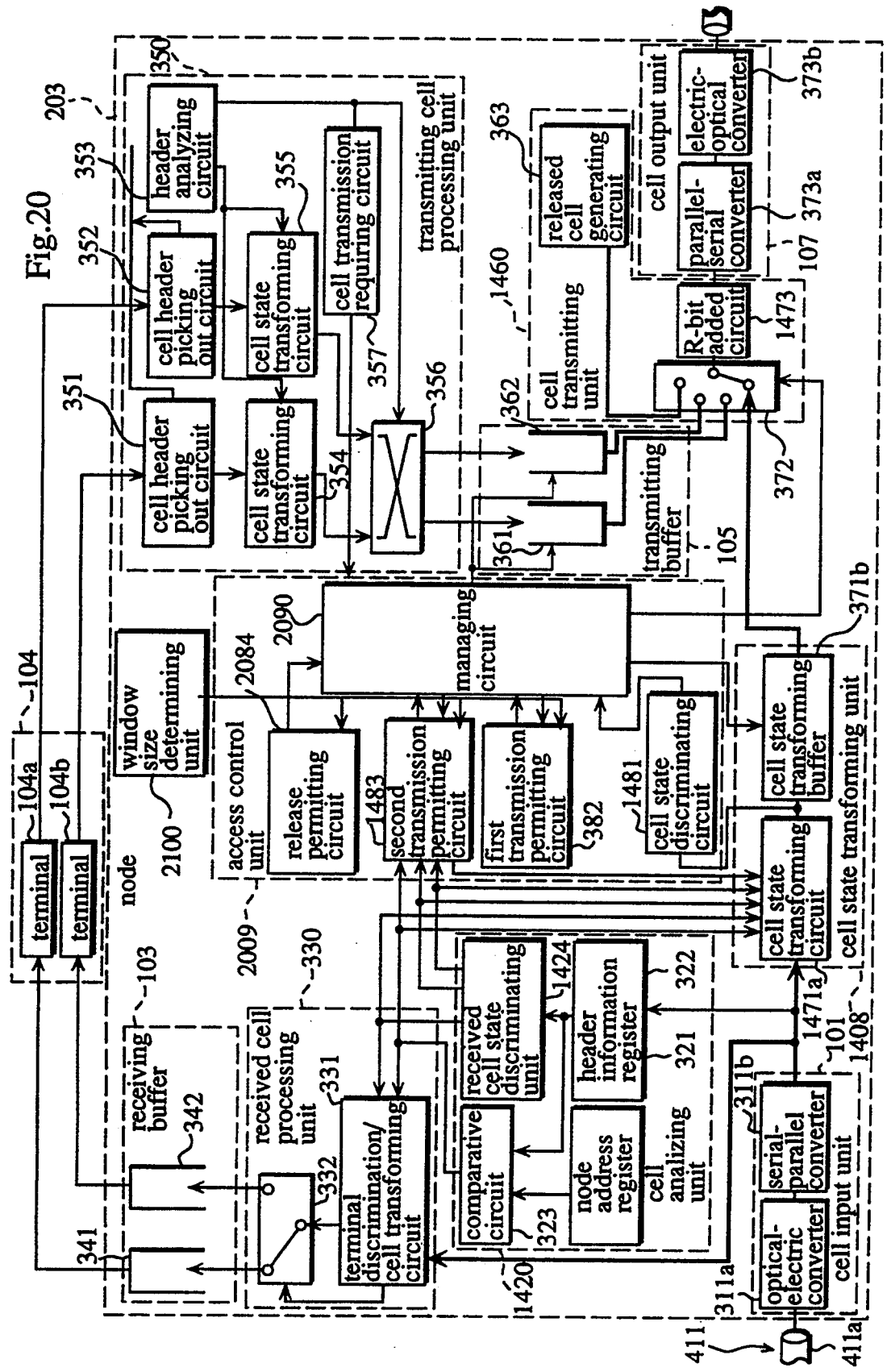
FIG. 20 is a diagram showing the detailed construction of the data transmission system of Embodiment 3 of this invention.

FIG. 20 shows the detailed configuration of a node used in this embodiment. In the figure, like components are labeled with like reference numerals with respect to Embodiment 2 shown in FIG. 14, and the description of these components is not repeated.

The access control unit 2009 only differs from the access control unit 1409 of Embodiment 2 in having a managing circuit 2090 in place of the managing circuit 1490, and additionally having a release permitting circuit 2084. As shown in FIG. 21, the access control unit 2009 controls ring cells to be transmitted, according to the states of ring cells transformed by the ring cell state transforming unit 1408, and W1, W2, Wm, Q1, and Q2. In the figure, "Wm" means window management, which manages the number of ring cells in the released state. As a different aspect from Embodiment 2, transmission of released cells is carried out within the range of Wm.

When the state of a ring cell transformed by the cell state transforming circuit 1471a is the idle state, the release permitting circuit 2084 determines whether the idle ring cell should be forwarded as it is or transmitted after being transformed into a released ring cell, provided that its first W1 has been exhausted (W1=0). If the circuit 2084 determines to transmit a ring cell in the released state, it outputs a signal informing permission to transmit a released cell. In Embodiment 2, under the condition that W1=0, each node forwards a received idle cell as it is to another node. However, in Embodiment 3, the release permitting circuit 2084 gives permission to transmit a ring cell in the released state within the window management.

Figure 22:
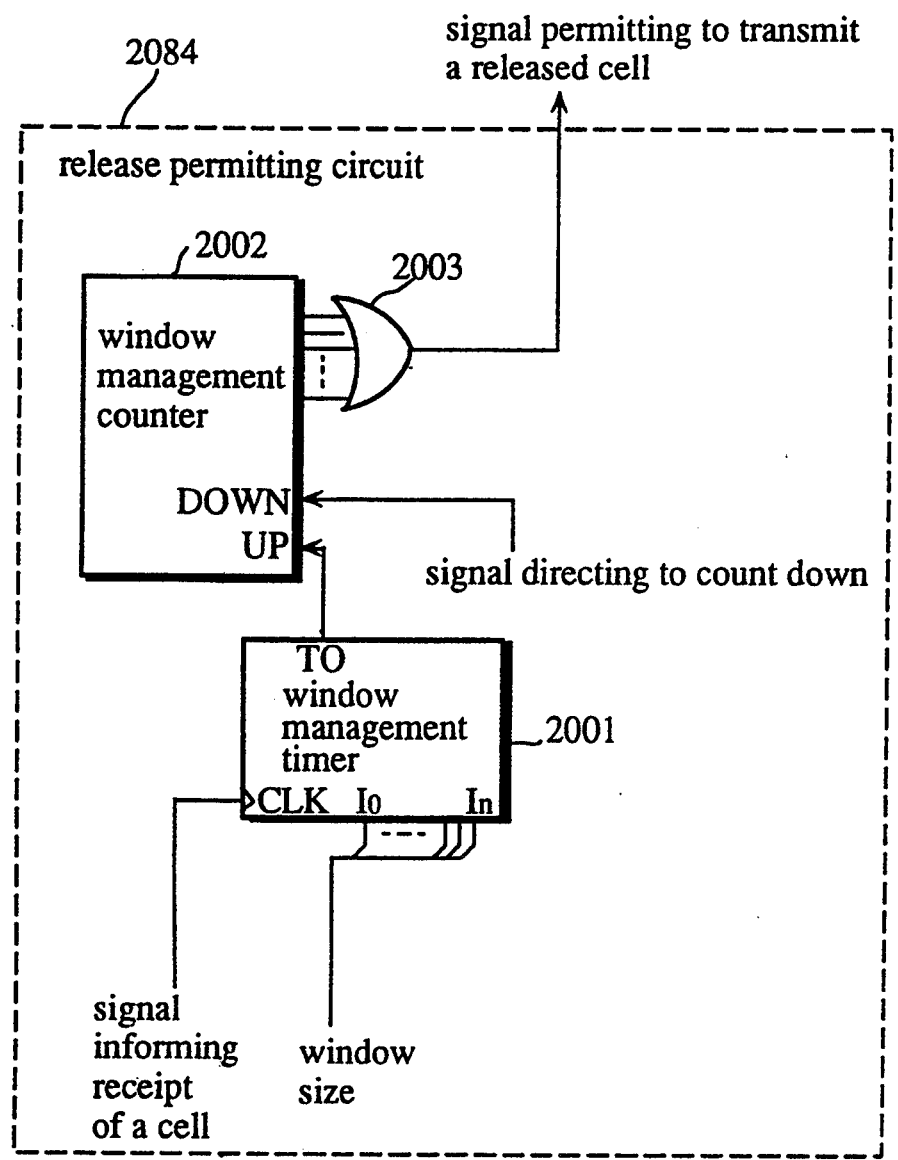
FIG. 22 is a diagram showing the detailed construction of the release permitting circuit 2084 in the access control unit 2009 of Embodiment 3.

As shown in FIG. 22, the release permitting circuit 2084 is composed of a timer 2001, a window management counter 2002, and an OR gate 2003.

The timer 2001 receives a signal in the form of a clock, which becomes active every time a ring cell is inputted. The timer 2001 also generates a time,out every time the number of ring cells corresponding to the assigned window band (Wm) has been exhausted, causing the window management counter 2002 to count up.

The window management counter 2002 counts up by 1 every time the timer 2001 generates a time-out, and counts down by 1 every time a signal directing to count down becomes active.

The OR gate 2003 outputs the signal directing to transmit a released cell in the form logical 1 when the window management band has not been exhausted, and outputs the signal in the form logical 0 when the window band has been exhausted.

Figure 23:
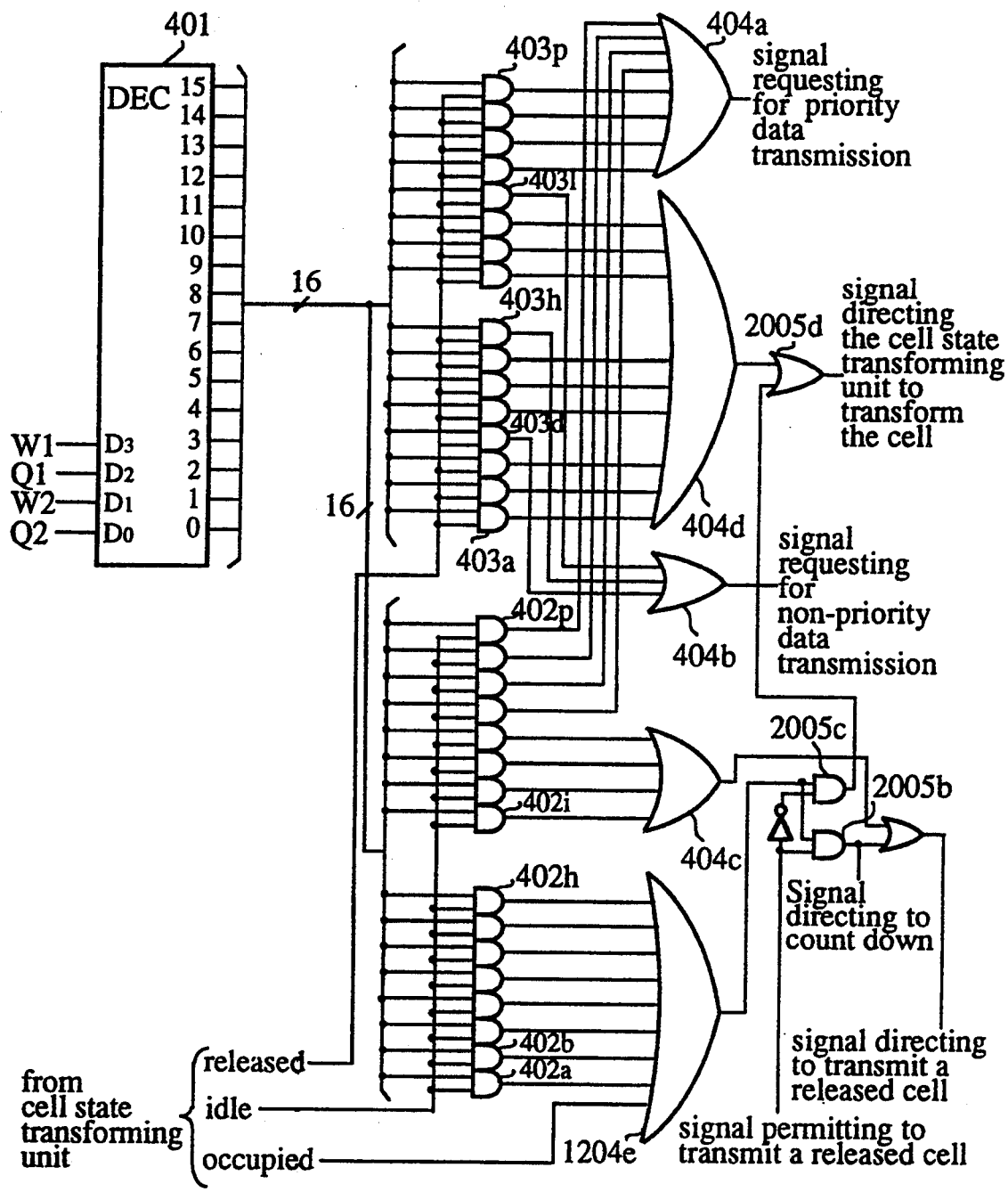
FIG. 23 is a diagram showing the detailed construction of the managing circuit 2090 in the access control unit 2009 of Embodiment 3.

As shown in FIG. 23, the managing circuit 2090 only differs from the managing circuit 1490 of Embodiment 2 shown in FIG. 19 in having an OR gate 2005d in place of the OR gate 404f and additionally having a NOT gate 2005a, an AND gate 2005b, and an AND gate 2005c on the stage next to the OR gate 1204e, and further having an OR gate 2005e on the stage next to the OR gate 404c.

When the state of a ring cell transformed by the cell state transforming circuit 1471a is the idle state, under the condition that W1=0, a logical "1" signal outputted from the OR gate 1204e is a signal directing to transmit a released cell responding to a signal permitting the transmission of a released cell sent from the release permitting circuit 2084. On the other hand, when this signal sent from the circuit 2084 is logical 0, the signal from the OR gate 404c is outputted as a signal directing the cell state transforming unit to transmit a ring cell.

Similarly to Embodiments 1 and 2, W1 and W2 are determined by the network managing unit 207 and informed to each node. To be more precise, the terminal 104, before staring transmission, reports information concerning priority data such as the maximum data rate, burst, peak intervals to the network managing unit 207. The network managing unit 207 judges whether additional window band can be assigned or not, determines the amount to be assigned, and reports the results to the terminal 104 and the node. In this embodiment, when the peak rate to transmit priority data from the node is made $p_p$, WS1 shown in the Equation 1 is assigned.

$$WS1 = \alpha\, p_p \quad\quad\quad Eq.\ 1$$

The symbol $\alpha$ is a safety factor to secure a margin for the peak rate, and is a constant of between 1.0 and 1.3.

The network managing unit 207 also assigns WS2 out of the remaining band, taking request from the terminals into account.

The window size determining unit 2100 determines the value of Wm as follows and sets it to the timer 2001.

Figure 24:
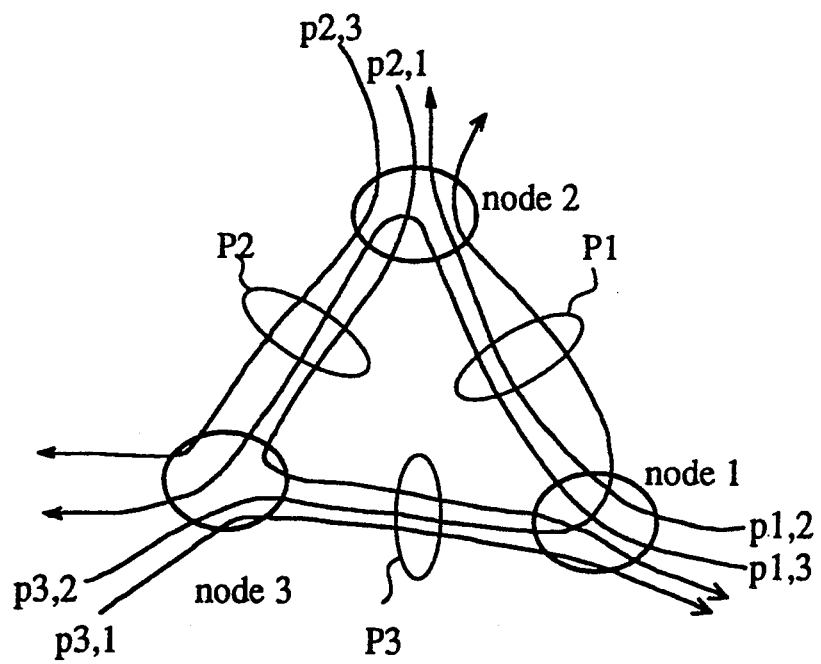
FIG. 24 is an illustration Showing the transmission paths on the ring network system having three nodes of Embodiment 3.

Now, a transmission path from a node m to a node n is made $p_{m,n}$. The transmission path is a route from the node m to the node n, and indicates the ratio of the capacity for transmitting ring cells from the node m to the node n to the capacity for transmitting ring cells on the entire ring transmission path. This ratio is assigned by the network managing unit 207. FIG. 24 shows a ring network with three nodes each assigned transmission paths. The transmission path $p_{1,2}$ is from node 1 to node 2. The path $p_{1,3}$ is from node 1 to node 3. The other four paths: $p_{2,1}$, $p_{2,3}$, $p_{3,1}$, $p_{3,2}$ are also provided in the same manner.

Provided that the data rate on the ring is 622 Mbps and each of the six transmission paths is assigned 100 Mbps, each transmission path is 100/622=0.16.

The link utilization rates $p_1$ of the route between a node (i) and an adjacent node (i+1) is found by the Equation 2 below indicating the total amount of the transmission paths on the route.

$$P_1 = \Sigma_{j+k<N-1} \Sigma p_{i-j,i+k+1} \; [mod;N] \qquad (2)$$

The integer N is the number of nodes present on the ring network.

For example, the link utilization rates $P_1$, $P_2$, $P_3$, respectively, on the routes from the node 1 to the node 2, from the node 2 to the node 3, and from the node 3 to the node 1 are found as follows.

$$P_1 = p_{1,2} + p_{1,3} + p_{3,2} = 0.48$$

$$P_2 = p_{2,3} + p_{2,1} + p_{1,3} = 0.48$$

$$P_3 = p_{3,1} + p_{3,2} + p_{2,1} = 0.48$$

Such information concerning the ring network is transmitted in the form of ring cells from the network managing unit 207 to the nodes and reported to the window size determining unit 2100 via the terminal 104. The window size determining unit 2100 determines the window management band $W_{m,1}$ of the node to which it belongs. This determination is based on the above-mentioned information and further based on information sent from the network managing unit 207 such as $\rho_{p,i}$ or $\rho_{a,i}$. The symbol $\rho_{p,i}$ indicates the peak value of the entire traffic of the priority ring cells sent to each node from the node (i), and $\rho_{a,i}$ indicates its average. The determination is carried out when the following two requirements are met:

(1) As shown in the Equation 3, when the peak value of the link utilization rate and the sum of each difference between the peak value of the entire traffic having safety factor ($\alpha \rho_{p,i}$) and its average ($\rho_{a,i}$) are added, the total sum is smaller than 1.

$$1 > MAX[P_1, P_2, \cdots P_N] + \Sigma(W_i - \rho_{a,i}) \qquad Eq. 3$$

In this equation $W_1 = \alpha \rho_{p,i}$, which is the peak value of the entire traffic having safety factor $\alpha$. The symbols $\rho_{p,i}$ and $\rho_{a,i}$ indicate a normalized rate between 0 and 1. The term $(W_i - \rho_{a,i})$ is the difference between the rate of the peak value of the entire traffic and the rate of the average value of the entire traffic used for priority information within the first window band. Therefore, $(W_i - \rho_{a,i})$ means the link utilization rate for the ring cells which the node (i) can transmit as released state cells within the first window band. As shown in the equation (3), when the right side is smaller than 1 in each route, cell flow interruption of priority data occurs.

(2) As shown in the Equation 4, the first window band assigned by the network managing unit 207 is larger than the value of the maximum link utilization rate on the ring network.

$$B_p > MAX[P_1, P_2, \cdots P_N] \qquad Eq. 4$$

In the equation, $B_p$ represents the normalized rate of the first window band assigned by the network managing unit 207.

When these two requirements are met, the window size determining unit 2100 determines $W_{m,i}$ by the following Equation 5.

$$W_{m,i} = \{\beta \, (1 - MAX[P_1, P_2, \cdots P_N] - (2-\beta) \Sigma(W_i - \rho_{a,i})\} \qquad Eq. 5$$

The operation of the above constructed data transmission system of Embodiment 3 is described only with respect to the condition that the state of a ring cell as transformed by the cell state transforming unit 108 is the idle state, and W1>0 and Q1=0. This is the only condition different from Embodiment 2.

When the state of a ring cell as transformed by the cell state transforming unit 108 is the idle state, the subsequent operation differs responding to Wm.

When Wm>0, the access control unit 2009 causes the cell transmitting unit 106 to transmit a released cell bound for the node which generated the cell to the cell output unit 107. At this moment, the first window counter 302 and the window management counter 2002 both count down by 1.

To be more precise, in the managing circuit 2090 shown in FIG. 23, one of the outputs of the AND gates 402i–1 becomes logical 1 and as a result, the output of the OR gate 404c becomes logical 1. At this moment, since a signal informing the permission to transmit a released cell sent from the release permitting circuit 2084 is logical 1, the AND gate 2005b outputs a signal directing the transmission of a ring cell in the released state. This signal is inputted to the OR gate 304b in the first transmission permitting circuit 382 shown in FIG. 10. This causes W1 of the first window counter 302 to count down by 1. The same signal is also inputted to the window management counter 2002, which also causes the Wm to decrement by 1. At the same time, a ring cell generated by the released cell generating circuit 363 is transmitted onto the ring via the selector 372 and the cell output unit 107.

When Wm=0, the output of the OR gate 404c becomes logical 1 in the same manner as above. However, since the signal informing permission to transmit a released cell is logical 0, the output of the AND gate 2005c becomes logical 1. As a result, a signal directing the cell state transforming unit to transmit the ring cell is outputted. Responding to this signal, ring cells present in the cell state transforming buffer 371b are transmitted onto the ring via the cell output unit 107.

As described hereinbefore, the window management band sets limits to the number of released cells to be transmitted.

In Embodiment 2, when the ring cell transmission for priority data has a traffic whose data rate changes with time, cell flow interruption is avoided by using the peak speed of the traffic as the criterion for setting the window band. However, efficiency of multiplexing between priority data and non-priority data among all the nodes is deteriorated. On the other hand, using $\alpha$ times of the average data rate as the criterion for setting the window band realizes an increase in the multiplexing efficiency; however, cell release may be caused on the peak speed. The cell release means transmission delay or overflow of data present in the transmitting buffer 361 due to no transmission of idle and released cells.

To avoid these problems, the nodes of Embodiment 3 have a window management band, which can increase efficiency of the multiplexing and prevent cell flow interruption.

The following is a description of the way to avoid the cell release of priority data, responding to the efficiency of utilization $\beta$.

When $\beta=1$, and the above-mentioned requirements (1) and (2) are met, then the rate of released cells generated in all the nodes is $\Sigma(W_i-\rho_{a,i})$. Provided that the link utilization rate between a node k and a node (k+1), or k link is $P_k=\text{MAX}[P_1, P_2, \text{---} P_N]$, the total utilization rate of the k link is $\text{MAX}[P_1, P_2, \text{---} P_N]+\Sigma(W_i-\rho_{a,i})$ even if non-priority data is transmitted by using all the released cells in $P_{k-1}$ nodes. The requirement (1) shows that the result is smaller than 1. Thus, the priority data in the node k is guaranteed the use of the band, so that no cell flow interruption occurs.

When $\beta>1$, if the above-mentioned requirements (1) and (2) are met, then the link utilization rate of all the ring cells carrying priority data is 1 or lower. If a node is in the condition that it cannot transmit priority data, the cells transmitted by the node should be all occupied state cells. If such condition lasts until the second window band becomes 0, it becomes impossible for the node to transmit nonpriority data. If, at this moment, the cells transmitted by the nodes are all occupied state cells, then the requirement that the link utilization rate of all the cells carrying priority data is 1 or below is not met. Therefore, priority data is guaranteed in the use of the band.

Under these requirements (1) and (2), a band for priority data and the other band for non-priority data are not separated from each other, or one does not included to the other; the non-priority data is efficiently inserted into paps occurred in the priority data. Such relationship is called statistic multiplexing.

The following is the reason that the statistic multiplexing is performed.

Now the rate that idle cells are transformed into occupied cells in the node i is made $\rho_{id,i}$, the rate that released cells are transformed into occupied cells becomes $\rho_{a,i}-\rho_{id,i}$, and the rate that idle cells are transformed into released cells becomes $W_i-\rho_{a,i}$. The rate that occupied cells transmitted by the node i are transformed into idle cells by other nodes becomes $\rho_{a,i}$. The rate that idle cells are transformed into released cells based on the window management counter 2002 becomes $W_{m,i}$. Therefore, the rate that released cell are transformed into idle cells in all the nodes becomes $\Sigma(W_{m,i}+W_i-\rho_{a,i})$. This is the traffic possible to be used for priority data. Thus statistic multiplexing including band of priority data $\Sigma W_i$.

The following is a description concerning other problems which may arise in data transmission.

When $\beta>1$ and $P_k=\text{MAX}[P_1, P_2, \text{---} P_N]$, and cells carrying non-priority data are transmitted equally from each node, the average length of the transmission paths becomes half of the entire transmission path. Therefore, when $\beta=2$, each ring cell has a cell utilization efficiency of 2 times on the average while the cells travel all the way around the transmission path. However, if the node (k−1) occupies all the released cells available and transmitted them to the other nodes than the node k, the band in the node k for transmitting priority data is not guaranteed until the second windows of all the nodes have been exhausted. In other words, transmission of priority data is delayed until the second windows have been exhausted (when the window size of the second window is $W_{s,i}$, the delay is $\Sigma W_{s,i}$ at most).

Such delay is caused because generation of released cells is carried out under the condition of $\beta>1$ though the actual utilization efficiency of the released cells is 1. At this time, the number of idle cells on the ring decreases, and as a result, the window management counter 2002 cannot obtain idle cells for $W_{m,i}$. This raises the value of the window management counter 2002. If the window management counter had no upper limit, the number of idle cells would decrease to zero.

There are two ways to solve this problem as follows:
(1) Provide a selected upper limit $L_{th}$ to the window management counter 2002.
(2) When the window management counter exceeds $L_{th}$, it is notified to the network managing unit 207. The network managing unit 207 directs the window size determining unit 2100 to set $\beta$ of all the nodes to 1.

Either one of these two methods realizes can be realized to reduce delay time of cell transmission by guaranteeing the band for priority data, responding to the condition of released cells being used.

Although the window management counter 2002 is provided in each node in this embodiment, it may be provided to the network managing unit 207 instead.

Figure 25:
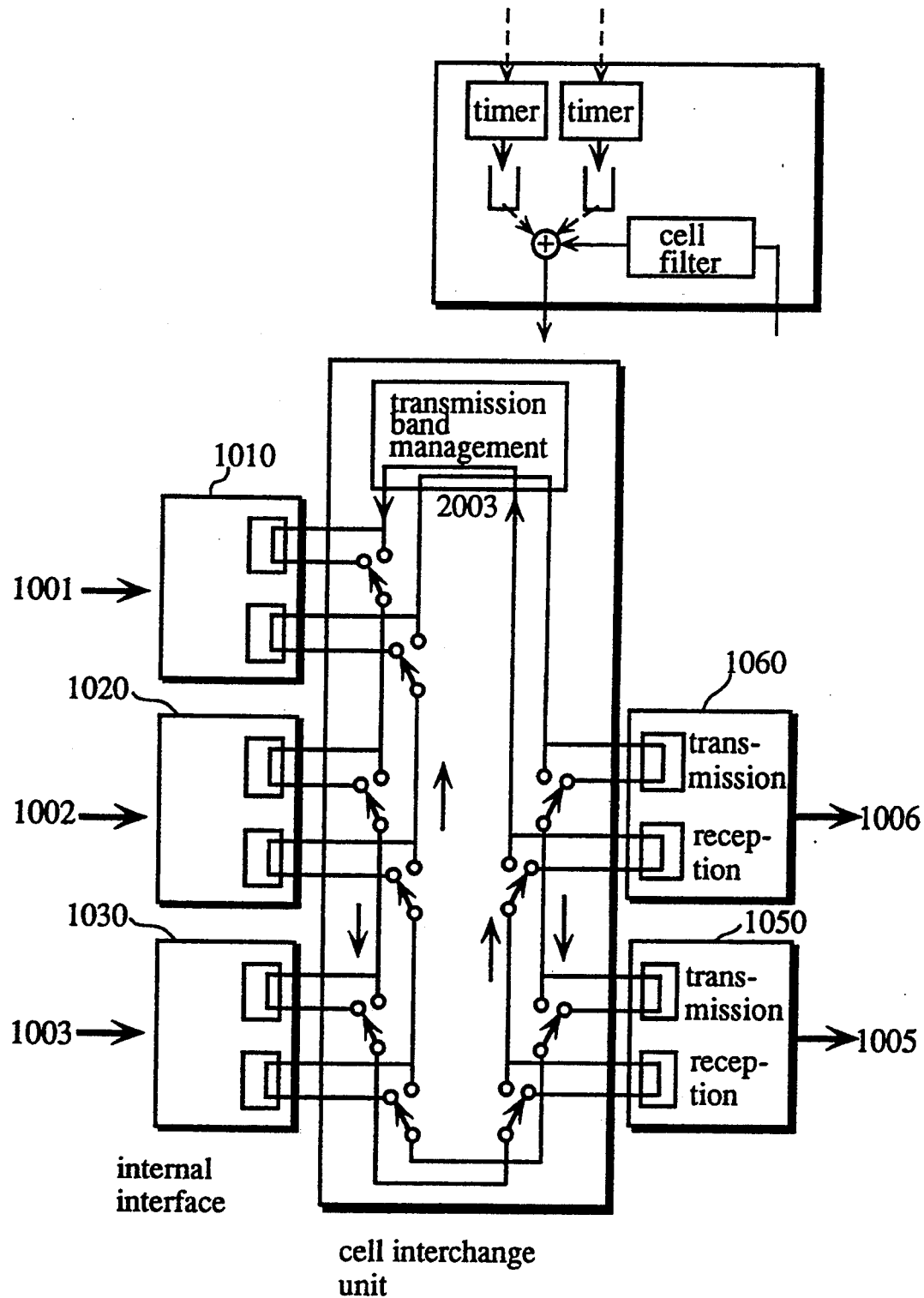
FIG. 25 is an example of the application of the node of this invention to a cell interchange unit used in a multimedia multiplexing device.

The nodes according to this invention may be used as a cell interchange unit in multimedia multiplexing device as shown in FIG. 25.

In the figure, internal interfaces 1010, 1020, and 1030 receive multimedia information from other information apparatuses 1001, 1002, and 1003. External interfaces 1050 and 1060 receive multimedia information from communication lines 1005 and 1006. Each of these interfaces correspond to the data transmission system of this invention, communication is performed by converting the inputted multimedia information to the format of ring cells. The ring cells travel over transmission paths 1041 and 104=2. A band managing unit 1070 generates the number of idle cells for the bands of the external interfaces 1050 and 1060. Furthermore, making each of the interfaces into an interface board realizes easy attachment or detachment thereof.

Although the present invention has bee fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data transmission unit for interconnecting with at least one other data transmission unit in a ring network via a transmission path to form a number of units, said number of units transmitting data in the form of packets, each packet having a fixed length, said data transmission unit comprising:

receiving means for receiving packets from the transmission path, each received packet being either occupied, idle, or released, an idle packet being a packet containing no user information;

transmitting means for inserting user data into a selected packet to create an occupied packet and transmitting the occupied packet to the transmission path and for generating and transmitting a released packet to the transmission path, a released packet being a packet containing no user information and containing information identifying it as a released packet originating from said unit;

discriminating means for discriminating the state of a received packet to be either occupied, idle, or released;

first judging means for judging whether the number of transmitted occupied packets, which are generated by inserting user data into received idle packets, reaches a first selected window assigned to said data transmission unit;

second judging means for judging whether the number of transmitted occupied packets, which are generated by inserting user data into received released packets, reaches a second selected window assigned to said data transmission unit;

relaying means for relaying packets from said receiving means to said transmitting means;

controlling means for controlling said transmitting means to occupy a received idle packet with user data, if any, and transmitting the occupied packet and continuing to transmit occupied packets until said first selected window is attained and, after said first selected window has been attained, for controlling said transmitting means to transmit the received idle packet from said relaying means; and said controlling means further controlling said transmitting means to occupy a received released packet bound for another said unit with user data and transmitting the occupied packet and continuing to transmit occupied packets until said second selected window is attained and, after said second selected window has been attained, for controlling said transmitting means to transmit the received released packet from said relaying means.

2. The data transmission unit of claim 1, wherein each of said first and second selected windows is the number of occupied packets transmitted from said unit per unit time, said number corresponding to the transmission capacity to be held by the occupied packets to be transmitted from said unit.

3. The data transmission unit of claim 1 further comprising: reset judging means for judging whether a received packet is a reset packet including a reset direction; and clearing means for, when a reset packet is received, clearing said number to be indicated by said second judging means.

4. The data transmission unit of claim 3, wherein said first selected window is the number of packets corresponding to $\alpha \rho_p$, which is the product between the peak traffic $\rho_p$ of the priority packets transmitted from said unit and a safety factor $\alpha$ in a range of between 1 and 1.3, said first selected window being determined by a following requirement:

$$1 > MAX[P_1, P_2, \cdots P_N] + \Sigma(W_i - \rho_{a,i}),$$

wherein N is an integer representing the number of said units on the ring network, $W_i$ is the ratio of transmission capacity corresponding to said first selected window assigned to the unit "i" to the entire transmission capacity of the ring network, i is an integer where $1 \leq i \leq N$, $\rho_{a,i}$ is the average ratio of the number of occupied packets to be transmitted from the unit "i" to the entire transmission capacity of the ring network, and $P_i$ is a link utilization rate between the unit "i" and the unit $i+1$.

5. The data transmission unit of claim 3 further comprising first transforming means for transforming received idle packets into released packets, wherein, when an idle packet is received, said controlling means controls said transmitting means to transmit a released packet from said first transforming means if there is no data to be transmitted and said first selected window has not been attained.

6. The data transmission unit of claim 5 further comprising:

detecting means for detecting whether a received packet is a released packet bound for said unit; and second transforming means for transforming a received released packet bound for said unit into a reset packet, wherein said controlling means controls said transmitting means to transmit a reset packet from said second transforming means when a released packet bound for said unit is received.

7. The data transmission unit of claim 6, wherein said second judging means comprises:

a register for storing said second selected window;

a counter for said second selected window for counting down by 1 every time an occupied packet is transmitted responding to judgement of said second judging means; and a second selected window judging circuit for judging the attainment of said second selected window from said counter for said second selected window being 0, and wherein said clearing means loads the contents stored in said register to said counter for said second selected window when a reset packet is received.

8. The data transmission unit of claim 7, wherein said first judging means comprises:

a timer circuit for generating time-outs per unit time, the number of said time-outs corresponding to said first selected window;

a counter for said first selected window for counting up by 1 every time a first timer generates a time-out and for counting down by 1 every time an occupied packet is transmitted responding to the judgment of said first judging means; and a first selected window judging circuit for judging the attainment of said first selected window, from said counter for said first selected window being 0.

9. The data transmission unit of claim 6, wherein after a reset packet is transmitted, said controlling means controls said transmitting means to continue transmitting idle packets until another reset packet is received, even when a released packet bound for said unit is received.

10. The data transmission unit of claim 9, wherein said controlling means has a flip flop, said flip flop being set when receipt of a released packet bound for said unit is detected and being reset when a reset packet is received, when a released packet bound for said unit is received, said controlling means further controls said transmitting means to transmit a reset packet if the flip flop is reset, and otherwise to transmit an idle packet.

11. The data transmission unit of claim 6, wherein said transmitting means has a first transmitting buffer for storing priority data and a second transmitting buffer for storing nonpriority data, and wherein said controlling means controls said transmitting means to occupy a received idle packet with priority data, to transmit the occupied packet, and to continue transmitting occupied packets until said first selected window has been attained; and said controlling means further controls said transmitting means to occupy a received release packet with one of priority data and non-priority data to transmit the occupied packet, non-priority data being selected when there is no priority data, and to continue transmitting occupied packets until said second selected window has been attained.

12. The data transmission unit of claim 11, wherein said second judging means comprises:
   a register for storing said second selected window;
   a counter for said second selected window for counting down by 1 every time an occupied packet is transmitted responding to judgement of said second judging means; and
   a second selected window judging circuit for judging the attainment of said second selected window from said counter for said second selected window being 0, and wherein
   said clearing means loads the contents stored in said register to said counter for said second selected window when a reset packet is received.

13. The data transmission unit of claim 1 further comprising:
   reset judging means for judging whether a received packet includes a reset bit indicative of a reset operation; and
   clearing means for, when it has been judged that a received packet includes a reset bit, clearing said number indicated by said second judging means.

14. The data transmission unit of claim 13 further comprising first transforming means for transforming received idle packets into released packets, wherein, when an idle packet is received, said controlling means controls said transmitting means to transmit a released packet from said first transforming means if there is no data to be transmitted and said first selected window has not been attained.

15. The data transmission unit of claim 13, wherein said first selected window is the number of packets corresponding to $\alpha p_p$, which is the product between the peak traffic $p_p$ of the priority packets transmitted from said unit and a safety factor $\alpha$ in a range of between 1 and 1.3, said first selected window being determined by a following requirement:

$$1\text{MAX}[P_1, P_2, \ldots P_N] + \Sigma(W_i - \rho_{a,i}),$$

wherein N is an integer representing the number of said units on the ring network, $W_i$ is the ratio of transmission capacity corresponding to said first selected window assigned to the unit "i" [$(1 \leq i \leq N$, i is an integer)] to the entire transmission capacity of the ring network, i is an integer where $1 \leq i \leq N$, $\rho_{a,i}$ is the average ratio of the number of occupied packets to be transmitted from the unit "i" to the entire transmission capacity of the ring network, and $P_i$ is a link utilization rate between the unit "i" and the unit $i+1$.

16. The data transmission unit of claim 15 further comprising:
   detecting means for detecting whether a received packet is a released packet bound for said unit; and
   reset bit setting means for setting a reset bit of a packet to be transmitted by said transmitting means, when receipt of a released packet bound for said unit is detected.

17. The data transmission unit of claim 16, wherein said second judging means comprises:
   a register for storing said second selected window;
   a counter for said second selected window for counting down by 1 every time an occupied packet is transmitted responding to judgement of said second judging means; and
   a second selected window judging circuit for judging the attainment of said second selected window from said counter for said second selected window being 0, and wherein
   said clearing means loads the contents stored in said register to said counter for said second selected window when a reset bit has been found by said reset judging means.

18. The data transmission unit of claim 17, wherein said first judging means comprises:
   a timer circuit for generating time-outs per unit time, the number of said time-outs corresponding to said first selected window;
   a counter for said first selected window for counting up by 1 every time a first timer generates a time-out and for counting down by 1 every time an occupied packet is transmitted responding to the judgement of said first judging means; and
   a first selected window judging circuit for judging the attainment of said first selected window, from said counter for said first selected window being 0.

19. The data transmission unit of claim 16, wherein, after a packet including a reset bit has been transmitted, said controlling means suspends the operation of said reset bit setting means until another packet including a reset bit is received, even when a released packet bound for said unit is received.

20. The data transmission unit of claim 19, wherein said controlling means has a flip flop, said flip flop being set when receipt of a released packet bound for said unit is detected and being reset when a packet including a reset bit is received, and wherein, when a released packet bound for said unit is received, said controlling means suspends the operation of said reset bit setting means while said flip flop is in the state of being set.

21. The data transmission unit of claim 16, wherein said transmitting means has a first transmitting buffer for storing priority data and a second transmitting buffer for storing nonpriority data, and wherein said controlling means controls said transmitting means to occupy a received idle packet with priority data, to transmit the occupied packet, and to continue transmitting occupied packets until said first selected window has been attained; and
   said controlling means further controls said transmitting means to occupy a received release packet with one of priority data and non-priority data to transmit the occupied packet, non-priority data being selected when there is no priority data, and to continue transmitting occupied packets until said second selected window has been attained.

22. The data transmission unit of claim 21, wherein said second judging means comprises:
   a register for storing said second selected window;
   a counter for said second selected window for counting down by 1 every time an occupied packet is transmitted responding to judgement of said second judging means; and
   a second selected window judging circuit for judging the attainment of said second selected window from said counter for said second selected window being 0, and wherein
   said clearing means loads the contents stored in said register to said counter for said second selected window when a packet including a reset bit has been received.

23. The data transmission unit of claim 1 further comprising:

first transforming means for transforming received idle packets into released packets, wherein, when an idle packet is received, said controlling means controls said transmitting means to transmit a released packet from said first transforming means if there is no data to be transmitted and said first window has not been attained; and third judging means for judging whether or not the number of transmitted released packets, which are generated by transforming received idle packets thereinto reaches a third selected window assigned to said data transmission unit;

wherein when an idle packet is received, said controlling means controls said transmitting means to transmit a released packet from said first transforming means if said first window has been attained and said third window has not been attained; and when an idle packet is received, said controlling means further controlling said transmitting means to transmit the idle packet from said relaying means if said first and third windows have been attained.

24. The data transmission of claim 23, wherein said transmitting means has a first transmitting buffer for storing priority data and a second transmitting buffer for storing non-priority data, and wherein said controlling means controls said transmitting means to occupy a received idle packet with priority data, to transmit the occupied packet, and to continue transmitting occupied packets until said first selected window has been attained; and said controlling means further controls said transmitting means to occupy a received release packet with one of priority data and non-priority data to transmit the occupied packet, non-priority data being selected when there is no priority data, and to continue transmitting occupied packets until said second selected window has been attained.

25. The data transmission unit of claim 24, wherein said third judging means comprises:

a managing timer for generating time-outs per unit time, the number of said time-outs corresponding to said third selected window;

a counter for said third selected window for counting up by 1 every time a time-out is generated and for counting down by 1 every time a released packet is transmitted if said first selected window has been attached; and a third selected window judging circuit for judging the attainment of said third selected window, from said counter for said third selected window being 0.

26. The data transmission unit of claim 25, wherein said first selected window is the number of packets corresponding to $\alpha \rho_p$, which is the product between the peak traffic $\rho_p$ of the priority packets transmitted from said unit and a safety factor $\alpha$ in a range of between 1 and 1.23.

27. The data transmission unit of claim 26, wherein when said third selected window $W_m$ meets a following requirement:

$$1 > MAX[_1, P_2, \text{---} P_N] + \Sigma(W_i - \rho_{a,i}),$$

said third window $W_m$ is found by a following equation:
$$W_{m,i} = \{\beta(1 - MAX[P_1, P_2, \text{---} P_N]) - (2 - \beta) \Sigma(W_i - \rho_{a,i})\}/N,$$

wherein N is an integer representing the number of said units on the ring network, $W_i$ is the ratio of transmission capacity corresponding to said first selected window assigned to the unit "i" to the entire transmission capacity of the ring network, i is an integer where $1 \leq i \leq N$, $\rho_{a,i}$ is the average ratio of the number of occupied packets to be transmitted from the unit "i" to the entire transmission capacity of the ring network, and $P_i$ is a link utilization rate between the unit "i" and the unit i+1, and $\beta$ is a consonant, $1 \leq \beta \leq 2$, indicating the average number of times that a released packet is used while traveling all around the transmission path.

28. The data transmission unit of claim 27, wherein when said counter for said third selected window exceeds a predetermined value, said third selected window is again decided under the condition that $\beta = 1$, and is again updated to said managing timer.

29. The data transmission unit of claim 27, wherein said counter for said third selected window does not count up after said predetermined value has been exceeded, even if said managing timer generates a time-out.

30. The data transmission unit of claim 23 further comprising:

reset judging means for judging whether a received packet is a reset packet including a reset direction;

clearing means for, when a reset packet is received, clearing said number to be indicated by said second judging means;

detecting means for detecting whether a received packet is a released packet bound for said unit or not; and second transforming means for transforming a received released packet bound for said unit into a reset packet, and wherein said controlling means controls said transmitting means to transmit a reset packet from said second transforming means when a released packet bound for said unit is received.

31. The data transmission unit of claim 30, wherein said second judging means comprises:

a register for storing said second selected window;

a counter for said second selected window for counting down by 1 every time an occupied packet is transmitted responding to judgement of said second judging means; and a second selected window judging circuit for judging the attainment of said second selected window from said counter for said second selected window being 0, and wherein said clearing means loads the contents stored in said register to said counter for said second selected window when a reset packet is received.

32. The data transmission unit of claim 31, wherein said first judging means comprises:

a timer circuit for generating time-outs per unit time, the number of said time-outs corresponding to said first selected window;

a counter for said first selected window for counting up by 1 every time a first timer generates a time-out and for counting down by 1 every time an occupied packet is transmitted responding to the judgment of said first judging means; and a first selected window judging circuit for judging the attainment of said first selected window, from said first selected window counter being 0.

33. The data transmission unit of claim 30, wherein after a reset packet is transmitted, said controlling means controls said transmitting means to continue transmitting idle packets until another reset packet is received, even when a released packet bound for said unit is received.

34. The data transmission unit of claim 33, wherein said controlling means has a flip flop, said flip flop being set when receipt of a released packet bound for said unit is detected and being reset when a reset packet is received, when a released packet bound for said unit is received, said controlling means further controls said transmitting means to transmit a reset packet if the flip flop is reset, and otherwise to transmit an idle packet.

35. The data transmission unit of claim 30, wherein transmitting means has a first transmitting buffer for storing priority data and a second transmitting buffer for storing nonpriority data, and wherein said controlling means controls said transmitting means to occupy a received idle packet with priority data, to transmit the occupied packet, and to continue transmitting occupied packets until said first selected window has been attained; and said controlling means further controls said transmitting means to occupy a received release packet with one of priority data and non-priority data to transmit the occupied packet, non-priority data being selected when there is no priority data, and to continue transmitting occupied packets until said second selected window has been attained.

36. The data transmission unit of claim 35, wherein said transmitting means has a first transmitting buffer for storing priority data and a second transmitting buffer for storing nonpriority data, and wherein said controlling means controls said transmitting means to occupy a received idle packet with priority data, to transmit the occupied packet, and to continue transmitting occupied packets until said first selected window has been attained; and said controlling means further controls said transmitting means to occupy a received release packet with one of priority data and non-priority data to transmit the occupied packet, non-priority data being selected when there is no priority data, and to continue transmitting occupied packets until said second selected window has been attained.

37. The data transmission unit of claim 23 further comprising:

reset judging means for judging whether a received packet includes a reset bit indicative to a reset operation or not;

clearing means for, when it has been judged that a received packet includes a reset bit, clearing said number indicated by said second judging means;

detecting means for detecting whether a received packet is a released packet bound for said unit or not; and reset bit setting means for setting a reset bit to a packet to be transmitted by said transmitting means, when receipt of a released packet bound for said unit is detected.

38. The data transmission unit of claim 37, wherein said second judging means comprises:

a register for storing said second selected window;
a counter for said second selected window for counting down by 1 every time an occupied packet is transmitted responding to judgement of said second judging means; and a second selected window judging circuit for judging the attainment of said second selected window from said counter for said second selected window being 0, and wherein said clearing means loads the contents stored in said register to said counter for said second selected window when a reset bit has been found by said reset judging means.

39. The data transmission unit of claim 38, wherein said first judging means comprises:

a timer circuit for generating time-outs per unit time, the number of said time-outs corresponding to said first selected window;

a counter for said first selected window for counting up by 1 every time a first timer generates a time-out and for counting down by 1 every time an occupied packet is transmitted responding to the judgment of said first judging means; and a first selected window judging circuit for judging the attainment of said first selected window, from said first selected window counter being 0.

40. The data transmission unit of claim 37, wherein after a packet including a reset bit has been transmitted, said controlling means suspends the operation of said reset bit setting means until another packet including a reset bit is received, even when a released packet bound for said unit is received.

41. The data transmission unit of claim 40, wherein said controlling means has a flip flop, said flip flop being set when receipt of a released packet bound for said unit is detected and being reset when a packet including a reset bit is received, and wherein, when a released packet bound for said unit is received, said controlling means suspends the operation of said reset bit setting means while said flip flop is in the state of being set.

42. The data transmission unit of claim 37, wherein transmitting means has a first transmitting buffer for storing priority data and a second transmitting buffer for storing nonpriority data, and wherein said controlling means controls said transmitting means to occupy a received idle packet with priority data, to transmit the occupied packet, and to continue transmitting occupied packets until said first selected window has been attained; and said controlling means further controls said transmitting means to occupy a received release packet with non-priority data, to transmit the occupied packet, and to continue transmitting occupied packets until said second selected window has been attained.

43. The data transmission unit of claim 42, wherein said second judging means comprises:

a register for storing said second selected window;
a counter for said second selected window for counting down by 1 every time an occupied packet is transmitted responding to judgement of said second judging means; and a second selected window judging circuit for judging the attainment of said second selected window from said counter for said second selected window being 0, and wherein said clearing means loads the contents stored in said register to said counter for said second selected window when a packet including a reset bit has been received.

44. A data transmission unit for interconnecting with other data transmission units in a ring network, the ring network including a transmission path for carrying idle packets containing no user data, occupied packets containing user data, and released packets containing the address of a unit which generated the released packet but no user data, the data transmission unit comprising:

receiving means for receiving packets from the transmission path;

transmitting means operatively connected to the receiving means for generating and transmitting to the transmission path first occupied packets formed by inserting user data into received idle packets, second occupied packets formed by inserting user data into received released packets, and released packets; and controlling means operatively connected to the transmitting means for controlling the numbers of first occupied packets and second occupied packets that can be generated and transmitted per unit of time.

45. The data transmission unit for interconnecting with other data transmission units according to claim 44, the controlling means including limiting means for limiting the number of generated and transmitted first occupied packets to a first predetermined rate and for limiting the number of generated and transmitted second occupied packets to a second predetermined rate.

46. The data transmission unit for interconnecting with other data transmission units according to claim 45, the transmitting means forming second occupied packets by inserting user data into received released packets, which contain addresses of units other than the unit comprising the transmitting means.

47. The data transmission unit for interconnecting with other data transmission units according to claim 45, the limiting means including:

first means for instructing the transmitting means to cease generation and transmission of first occupied packets when the first predetermined rate is reached; and second means for instructing the transmitting means to cease generation and transmission of second occupied packets when the second predetermined rate is reached.

48. The data transmission unit for interconnecting with other data transmission units according to claim 47, the limiting means further including:

third means for instructing the transmitting means to transmit, unchanged, received idle packets to the transmission path when the first predetermined rate is reached; and fourth means for instructing the transmitting means to transmit, unchanged, received released packets to the transmission path when the second predetermined rate is reached.

49. A data transmission node for transmitting and receiving data with other data transmission nodes in a ring network, the ring network including a transmission path for carrying cells, the data transmission node comprising:

receiving means for receiving from the transmission path idle cells containing no user data, occupied cells containing user data, and released cells containing the address of a node which generated the released cell but no user data;

discriminating means operatively connected to the receiving means for discriminating whether a received cell is idle, occupied, or released;

generating means connected to the discriminating means for generating first occupied cells by inserting user data into received idle cells, second occupied cells by inserting user data into received released cells, and released cells;

transmitting means operatively connected to the generating means for transmitting the first occupied cells, second occupied cells, and released cells; and controlling means operatively connected to the transmitting means for controlling the numbers of first occupied cells and second occupied cells that are transmitted per unit of time.

* * * * *